(12) United States Patent
Sakakibara et al.

(10) Patent No.: US 11,204,237 B2
(45) Date of Patent: Dec. 21, 2021

(54) METHOD FOR CONTROLLING SHAPE MEASURING APPARATUS

(71) Applicant: MITUTOYO CORPORATION, Kawasaki (JP)

(72) Inventors: Shota Sakakibara, Utsunomiya (JP); Hiroshi Kamitani, Utsunomiya (JP)

(73) Assignee: MITUTOYO CORPORATION, Kawasaki (JP)

(*) Notice: Subject to any disclaimer, the term of this patent is extended or adjusted under 35 U.S.C. 154(b) by 0 days.

(21) Appl. No.: 17/069,256

(22) Filed: Oct. 13, 2020

(65) Prior Publication Data

US 2021/0108909 A1 Apr. 15, 2021

(30) Foreign Application Priority Data

Oct. 14, 2019 (JP) .............................. JP2019-188280
Oct. 14, 2019 (JP) .............................. JP2019-188283

(51) Int. Cl.
*G01B 5/008* (2006.01)
*G01B 11/02* (2006.01)
(Continued)

(52) U.S. Cl.
CPC .............. *G01B 11/02* (2013.01); *G01B 5/008* (2013.01); *G01B 11/254* (2013.01);
(Continued)

(58) Field of Classification Search
CPC .................................................... G01B 5/008
(Continued)

(56) References Cited

U.S. PATENT DOCUMENTS 6,785,973 B1 * 9/2004 Janssen ................. G01B 5/004
33/1 N
7,918,033 B2 * 4/2011 Held .................... G01B 21/042
33/503

(Continued)

FOREIGN PATENT DOCUMENTS

JP 5274782 8/2013
JP 6030339 11/2016
JP 6063161 1/2017

*Primary Examiner* — George B Bennett
(74) *Attorney, Agent, or Firm* — Rankin, Hill & Clark LLP

(57) ABSTRACT

There is provided a method for controlling a shape measuring apparatus that relatively moves a probe and a workpiece with a translation movement mechanism and a rotary drive mechanism to perform scanning measurement on the workpiece by moving the probe along a scanning path set in advance.
The method includes setting, by an operator, a scanning path and a rotation angle command for the rotary drive mechanism, dividing data about the scanning path into a plurality of segments and setting a translational velocity pattern of the translation movement mechanism for each segment, calculating for each segment, based on the rotation angle command, a rotation angle value at a start of the segment and a rotation angle value at an end of the segment and generating an angular velocity pattern for each segment, correcting the translational velocity pattern to reduce a rotation amount of the rotation command given by the angular velocity pattern and generating a corrected translational velocity pattern, and driving and controlling, based on a resultant velocity vector based on the corrected translational velocity pattern, the translation movement mechanism and simultaneously driving and controlling, based on an angular velocity command based on the angular velocity pattern, the rotary drive mechanism.

15 Claims, 29 Drawing Sheets

(51) Int. Cl.
  *G01B 11/25* (2006.01)
  *G01B 21/04* (2006.01)
  *G05B 19/401* (2006.01)
  *G05B 19/19* (2006.01)

(52) U.S. Cl.
  CPC .......... *G01B 11/2518* (2013.01); *G01B 21/04* (2013.01); *G05B 19/19* (2013.01); *G05B 19/401* (2013.01)

(58) Field of Classification Search
  USPC .......................................................... 33/503
  See application file for complete search history.

(56) References Cited

U.S. PATENT DOCUMENTS

| | | | |
|---|---|---|---|
| 8,006,398 B2* | 8/2011 | McFarland | G01B 21/045 |
| | | | 33/503 |
| 9,103,648 B2* | 8/2015 | Noda | G01B 5/008 |
| 9,341,459 B2* | 5/2016 | Noda | G01B 5/008 |
| 9,366,592 B2* | 6/2016 | Goto | G01B 21/04 |
| 9,383,198 B2* | 7/2016 | Sagemueller | B23Q 17/225 |
| 9,557,157 B2* | 1/2017 | Ihlenfeldt | G01C 3/08 |
| 9,933,248 B2* | 4/2018 | Mariller | G01B 5/14 |

* cited by examiner

METHOD FOR CONTROLLING SHAPE MEASURING APPARATUS

INCORPORATION BY REFERENCE

This application is based upon and claims the benefit of priority from JP patent applications No. 2019-188280 and 2019-188283, filed on Oct. 14, 2019 (DAS code 77BD and F0CD), the disclosures of which are incorporated herein in its entirety by reference.

BACKGROUND OF THE INVENTION

1. Field of the Invention

The present invention relates to a method for controlling a shape measuring apparatus.

2. Description of Related Art

There is a known shape measuring apparatus that measures the shape of an object to be measured by moving a stylus tip along a surface of the object to be measured while scanning the surface (for example, see JP 5274782 B, JP 6030339 B, and JP 6063161 B). In order to perform scanning measurement, a path for the scanning measurement needs to be set.

The apparatus disclosed in JP 5274782 B converts design data about a scanning path based on CAD data or the like (for example, non-uniform rational B-spline (NURBS) data) into a group of polynomial curves with a predetermined degree.

This procedure is briefly described below.

First, CAD data (for example, NURBS data) including path information is received from an external CAD system or the like and is converted into point group data.

The data of each point is a combination of coordinates (x, y, z) and normal line directions (P, Q, R), that is, (x, y, z, P, Q, R). In this specification, the point group data including the information (x, y, z, P, Q, R) is referred to as contour point data.

Next, the coordinates of each point are offset in the normal line direction by a predetermined amount. (The predetermined amount is, specifically, stylus tip radius r—reference deflection amount E0.) The point group data obtained in this manner is referred to as offset contour point data.

Then, the offset contour point data is converted into polynomial curves with a predetermined degree. Here, it is assumed that the polynomial is a cubic function, and the curves are parametric cubic curves (PCCs). A path for measuring a workpiece is generated based on the PCCs. Furthermore, the PCCs are divided into divided PCCs.

By calculating a velocity curve from the divided PCCs, the moving speed (movement vector) of a probe is obtained. (For example, the moving speed (movement vector) of the probe is set based on the curvature or the like of each segment of the divided PCCs.) The probe is moved based on the moving speed in such a manner that the stylus tip scans the surface of an object to be measured, that is, passive nominal scanning measurement is performed. (Note that, the word "nominal" in this specification means scanning along a predetermined trajectory calculated in advance based on design data of an object).

Furthermore, there is a known method for performing scanning measurement while correcting a trajectory by continuously calculating a deflection correcting vector in such a manner as to keep a deflection amount of a probe to be constant (JP 6030339 B). Hereinafter, such nominal scanning is referred to as "active nominal scanning measurement".

The active nominal scanning measurement disclosed in JP 6030339 B is briefly described below.

In the active nominal scanning measurement, a resultant velocity vector V expressed by the following Expression 1 is a command for moving a probe. When the probe is moved based on the resultant velocity vector V, workpiece-surface scanning measurement in which the probe (stylus tip) is moved along a PCC while a deflection amount is constant, that is "active nominal scanning measurement" is performed.

$$V = Gf \times Vf + Ge \times Ve + Gc \times Vc \quad \text{(Expression 1)}$$

With reference to FIG. 1, Expression 1 is briefly described. In FIG. 1, a PCC (that is, a scanning path) is at a position offset from design data (contour point data) by a predetermined amount (stylus tip radius r—reference deflection amount E0). (Note that, FIG. 1 shows that an actual workpiece is slightly shifted from design data due to a machining error or the like.)

The vector Vf is a path velocity vector. The path velocity vector Vf has a direction from an interpolation point (i) on the PCC toward the next interpolation point (i+1).

Note that, the magnitude of the path velocity vector Vf is determined based on, for example, the curvature of the PCC at the interpolation point (i) (for example, JP 6063161 B).

The vector Ve is a deflection amount correcting vector for keeping the deflection amount Ep of the probe to be a predetermined reference deflection amount E0 (for example, 0.3 mm). (The deflection amount correcting vector Ve is necessarily parallel with the normal line of the surface of the workpiece.)

The vector Vc is a trajectory correcting vector. The trajectory correcting vector is parallel with the perpendicular drawn from the probe position to the PCCs. In Expression 1, Gf, Ge, and Gc are a scanning driving gain, a deflection direction correcting gain, and a trajectory correcting gain, respectively.

FIG. 2 shows an example of PCCs.

A PCC L_PCC is a line connecting from a point P1 to a point P7, and the PCC L_PCC is divided by points P into a plurality of segments. (Each segment is also a PCC.)

The end point of each segment is the start point of the next segment (PCC). The coordinates of the start point of each segment are represented as $(K_{X0}, K_{Y0}, K_{Z0})$, and the length of the straight line between the start point and the end point of the PCC is represented as D. With this definition, the coordinates $\{X(S), Y(S), Z(S)\}$ at an arbitrary point on the PCC are expressed by the following Expression (2) with coefficients $(K_{X3}, K_{X2}, \ldots, K_{Z1}, K_{Z0})$ representing a cubic curve.

$$X(S) = K_{X3}S^3 + K_{X2}S^2 + K_{X1}S + K_{X0}$$

$$Y(S) = K_{Y3}S^3 + K_{Y2}S^2 + K_{Y1}S + K_{Y0}$$

$$Z(S) = K_{Z3}S^3 + K_{Z2}S^2 + K_{Z1}S + K_{Z0} \quad \text{(Expression 2)}$$

The path for performing scanning measurement on an object to be measured is generated with Expression (2), and the probe is controlled in such a manner as to perform scanning movement along the calculated PCC with the resultant velocity vector V (Expression (1)). Then, the measurement result of performing scanning measurement on the object to be measured is obtained.

SUMMARY OF THE INVENTION

Recently, shapes of objects to be measured have been rather complicated, and performing quick and accurate scanning measurement on workpieces having complicated shapes has been desired. For example, there is a need for performing quick and accurate scanning measurement on a blade of a turbine shown in FIG. 3. Existing coordinate measuring machines (JP 5274782 B, JP 6030339 B, and JP 6063161 B) each have three drive axes of an X drive axis, a Y drive axis, and a Z drive axis that are orthogonal to each other and move a probe relatively to an object to be measured with the three orthogonal drive axes.

However, with an existing coordinate measuring machine, as the shape of an object to be measured is complicated, the motion of the probe is complicated accordingly. Then, the moving speed of the probe becomes slow, and this takes long time to perform measurement. Furthermore, depending on the shape of a workpiece, the stylus of the probe can interfere with the workpiece, and measurement cannot be performed.

The present invention is to provide a method for controlling a shape measuring apparatus capable of improving measurement efficiency by shortening measurement time although an object to be measured has a complicated shape.

A method for controlling a shape measuring apparatus according to an embodiment of the present invention is a method for controlling a shape measuring apparatus that relatively moves a probe and a workpiece with a translation movement mechanism and a rotary drive mechanism to perform scanning measurement on the workpiece by moving the probe along a scanning path set in advance, the method including:

synchronizing a movement command for the translation movement mechanism with a rotation command for the rotary drive mechanism in such a manner as to perform scanning measurement on the workpiece by moving the probe along the scanning path.

In an embodiment of the present invention, the method may further include:

setting, by an operator, a scanning path and a rotation angle command for a rotary table;

generating, based on data about the scanning path, a translational velocity vector command for driving and controlling the translation movement mechanism in such a manner that the probe moves along the scanning path;

generating, based on the rotation angle command, a rotation command for the rotary drive mechanism;

correcting the translational velocity vector command to reduce a rotation amount of the rotation command and generating a corrected translational velocity vector command; and driving and controlling, based on the rotation command and the corrected translational velocity vector command, the rotary drive mechanism and the translation movement mechanism.

In an embodiment of the present invention, the method may further include:

setting, by an operator, a scanning path and a rotation angle command for a rotary table;

correcting data about the scanning path to reduce a rotation amount of the rotation command and generating corrected scanning path data;

generating, based on the corrected scanning path data, a translational velocity vector command for driving and controlling the translation movement mechanism;

generating, based on the rotation angle command, a rotation command for the rotary drive mechanism; and driving and controlling, based on the rotation command and the translational velocity vector command, the rotary drive mechanism and the translation movement mechanism.

In an embodiment of the present invention, the method may further include:

setting, by an operator, a scanning path;

generating, based on data about the scanning path, a translational velocity vector command for driving and controlling the translation movement mechanism in such a manner that the probe moves along the scanning path;

generating, based on the translational velocity vector command, a rotation command for the rotary drive mechanism;

correcting the translational velocity vector command to reduce a rotation amount of the rotation command and generating a corrected translational velocity vector command; and driving and controlling, based on the rotation command and the corrected translational velocity vector command, the rotary drive mechanism and the translation movement mechanism.

In an embodiment of the present invention, it is preferable that the generating, based on the translational velocity vector command, the rotation command for the rotary drive mechanism includes generating, based on a change in a direction of a path velocity vector Vf, the rotation command for the rotary drive mechanism, and the path velocity vector Vf is a vector having a direction from one interpolation point on the scanning path to the next interpolation point.

In an embodiment of the present invention, it is preferable that the generating, based on the translational velocity vector command, the rotation command for the rotary drive mechanism includes generating, based on an angle formed by a deflection amount correcting vector Ve and an approaching direction AP, the rotation command for the rotary drive mechanism, the approaching direction AP is a predetermined direction in which the translation movement mechanism brings the probe into contact with the workpiece, and the deflection amount correcting vector Ve is a vector for correcting a deflection amount Ep of the probe to be a predetermined reference deflection amount E0 and has a direction parallel with a normal line of the workpiece at a contact point.

In an embodiment of the present invention, it is preferable that the generating, based on the translational velocity vector command, the rotation command for the rotary drive mechanism includes:

calculating a virtual circle C1 having a rotation center Oc of the rotary drive mechanism as a center and a distance r1 between a contact point of the probe and the workpiece and the rotation center Oc as a radius;

calculating a tangent line L1 of the virtual circle C1 at the contact point;

calculating a rotating direction vector VL1 being an element of the translational velocity vector command in a direction of the tangent line L1; and generating, based on the rotating direction vector VL1, the rotation command for the rotary drive mechanism.

In an embodiment of the present invention, the method may further include:

setting, by an operator, a scanning path and a rotation angle command for the rotary drive mechanism;

dividing data about the scanning path into a plurality of segments and setting, based on a curvature of each segment, a translational velocity pattern of the translation movement mechanism for each segment;

calculating for each segment, based on the rotation angle command, a rotation angle value at a start of the segment and a rotation angle value at an end of the segment and generating an angular velocity pattern for each segment;

correcting the translational velocity pattern to reduce a rotation amount of the rotation command given by the angular velocity pattern and generating a corrected translational velocity pattern; and driving and controlling, based on a resultant velocity vector based on the corrected translational velocity pattern, the translation movement mechanism and simultaneously driving and controlling, based on an angular velocity command based on the angular velocity pattern, the rotary drive mechanism.

In an embodiment of the present invention, the method may further include:

setting, by an operator, a scanning path and a rotation angle command for the rotary drive mechanism;

correcting data about the scanning path to reduce a rotation amount of the rotation angle command and generating corrected scanning path data;

dividing the corrected scanning path data into a plurality of segments and setting, based on a curvature of each segment, a translational velocity pattern of the translation movement mechanism for each segment;

calculating for each segment, based on the rotation angle command and the translational velocity pattern for each segment, a rotation angle value at a start of the segment and a rotation angle value at an end of the segment;

generating an angular velocity pattern for each segment; and driving and controlling, based on a resultant velocity vector based on the translational velocity pattern, the translation movement mechanism and simultaneously driving and controlling, based on an angular velocity command based on the angular velocity pattern, the rotary drive mechanism.

In an embodiment of the present invention, the method may further include:

setting, by an operator, a scanning path;

dividing data about the scanning path into a plurality of segments and setting, based on a curvature of each segment, a translational velocity pattern of the translation movement mechanism for each segment;

generating, based on the data about the scanning path, a translational velocity vector command for driving and controlling the translation movement mechanism in such a manner that the probe moves along the scanning path;

generating, based on the translational velocity vector command, a rotation command for the rotary drive mechanism;

calculating for each segment, based on the rotation angle command, a rotation angle value at a start of the segment and a rotation angle value at an end of the segment and generating an angular velocity pattern for each segment;

correcting the translational velocity pattern to reduce a rotation amount of the rotation command given by the angular velocity pattern and generating a corrected translational velocity pattern; and driving and controlling, based on a resultant velocity vector based on the corrected translational velocity pattern, the translation movement mechanism and simultaneously driving and controlling, based on an angular velocity command based on the angular velocity pattern, the rotary drive mechanism.

In an embodiment of the present invention, it is preferable that the generating the angular velocity pattern for each segment includes:

setting a magnitude of an angular acceleration to a predetermined fixed value; and applying, to each segment, any one of a pattern for maintaining a constant angular velocity, a pattern for accelerating initially and then maintaining a constant angular velocity, and a pattern for maintaining a constant angular velocity initially and then decelerating, by starting calculation from the first segment to generate the angular velocity pattern.

In an embodiment of the present invention, the method may further include:

calculating, if the angular velocity is not zero at an end point of the scanning path after the angular velocity pattern for the last segment is generated, a deceleration distance required for the rotary drive mechanism to stop at the end point of the scanning path and correcting the angular velocity pattern in such a manner that the rotary drive mechanism starts decelerating from the required deceleration distance before the end point.

In an embodiment of the present invention, the method may further include:

blocking a plurality of the angular velocity patterns generated for each segment; and S-shaped curving an acceleration/deceleration region of the blocked angular velocity pattern.

DETAILED DESCRIPTION

Figure 1:
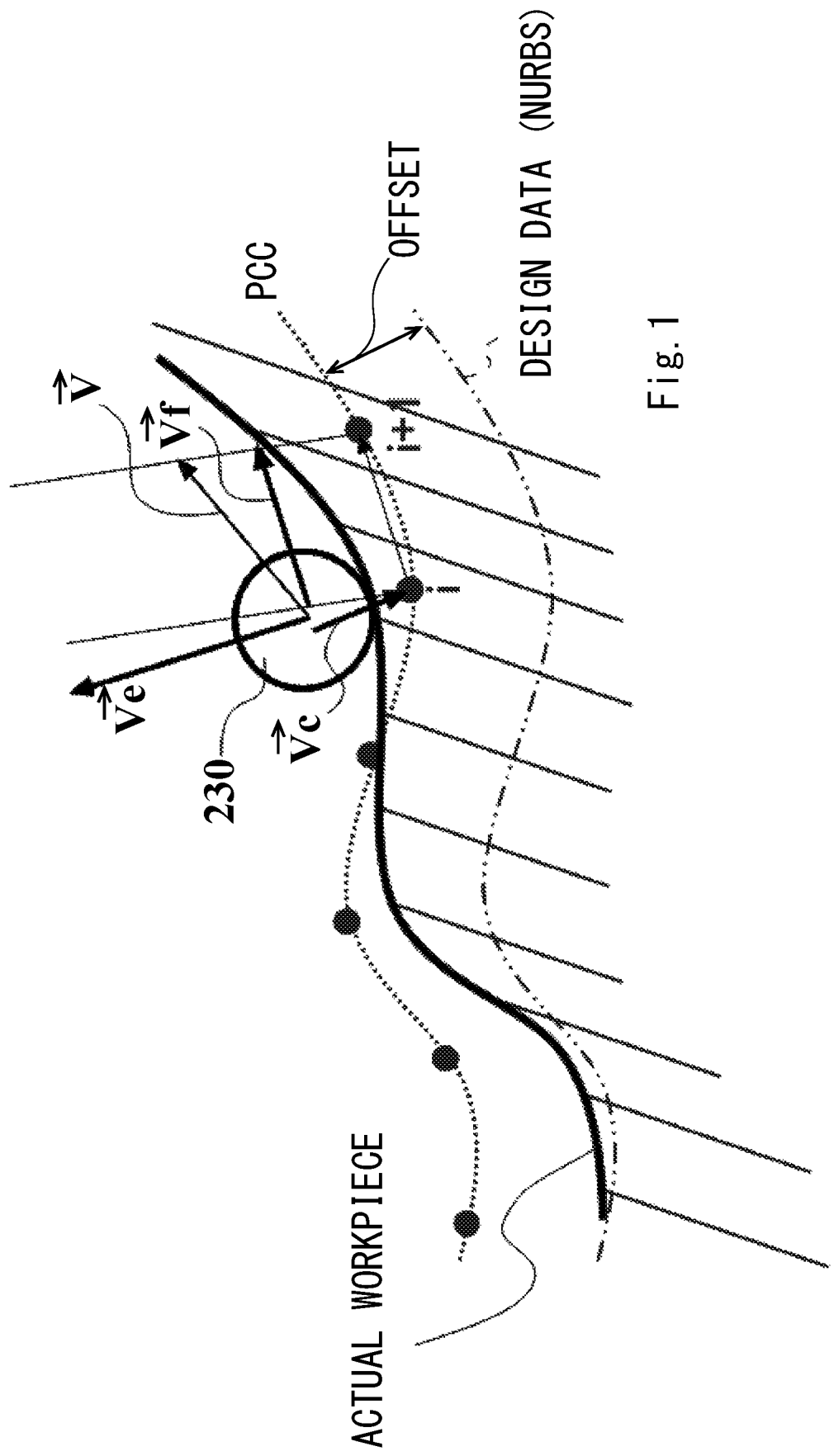
FIG. 1 is a diagram schematically showing the relationship between design data, a PCC, and a resultant vector.
Figure 2:
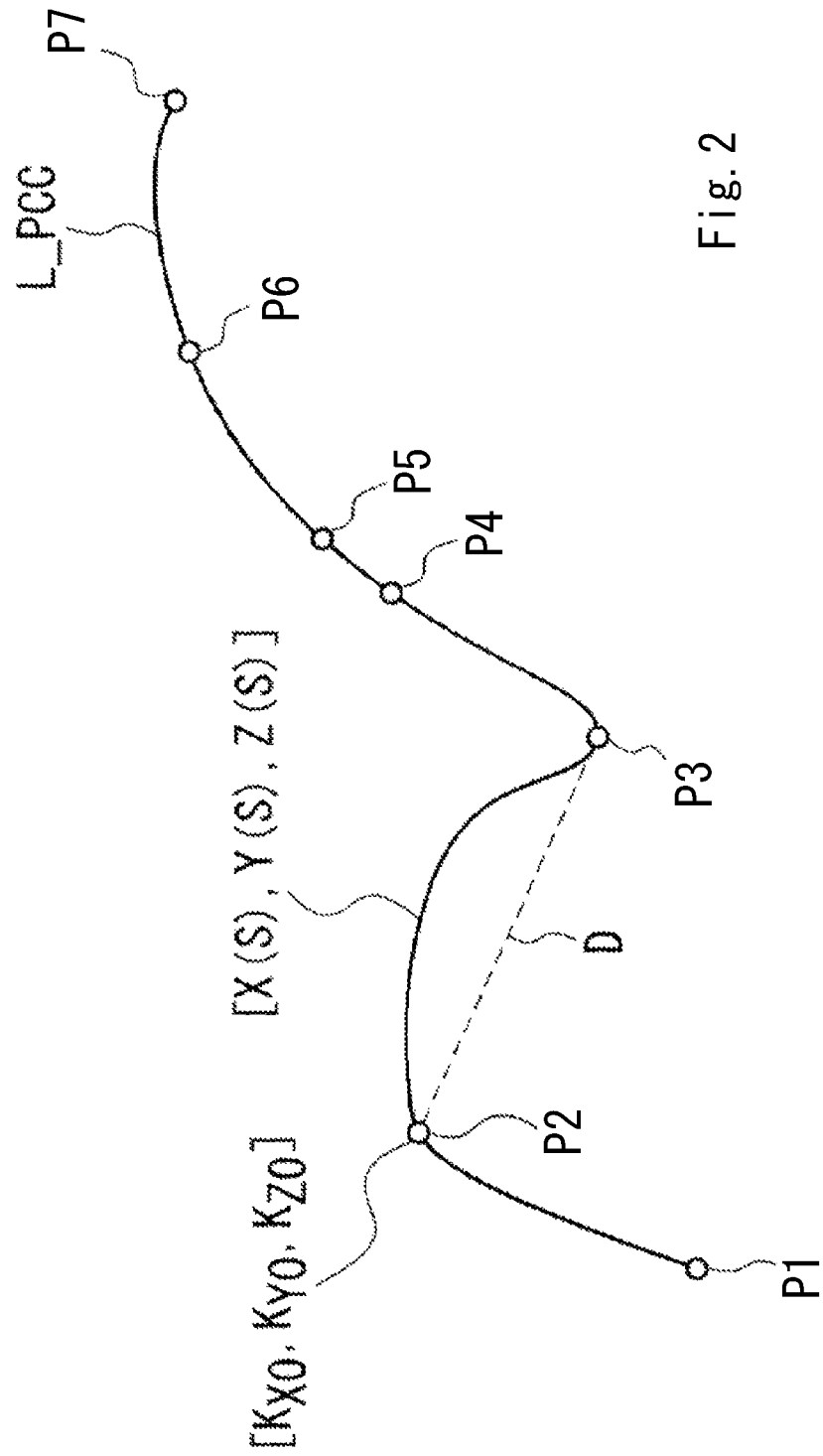
FIG. 2 is a diagram showing an example of a PCC.
Figure 3:
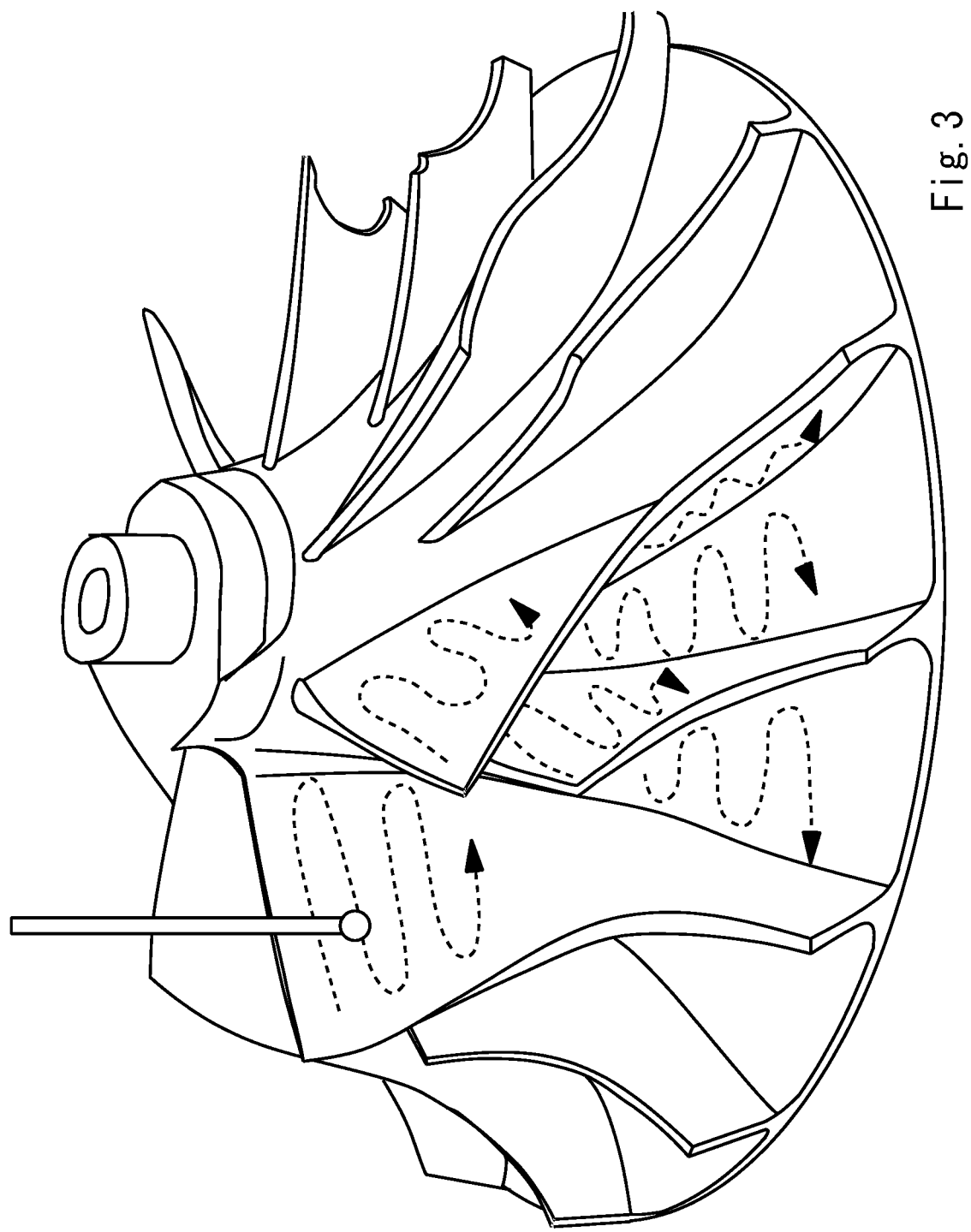
FIG. 3 is a diagram showing an example of an object to be measured.

Embodiments of the present invention are illustrated and described with reference to reference signs attached to the elements in the drawings.

First Exemplary Embodiment

Figure 4:
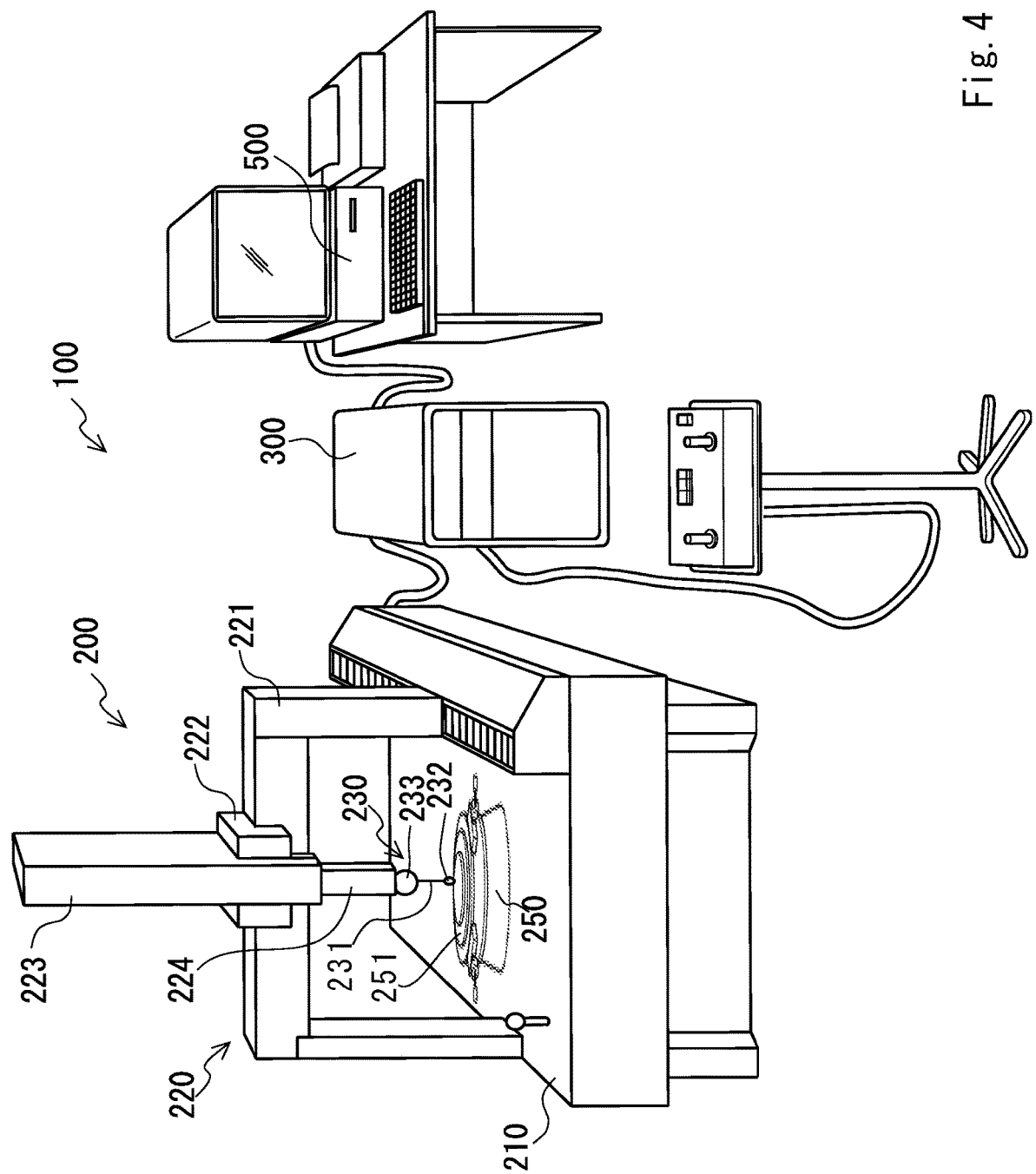
FIG. 4 is a diagram showing a configuration of an entire shape measuring system.

FIG. 4 is a diagram showing a configuration of an entire shape measuring system 100. The shape measuring system 100 includes a coordinate measuring machine 200, a motion controller 300 that controls the drive of the coordinate measuring machine 200, and a host computer 500 that controls the motion controller 300 and performs necessary data processing.

The coordinate measuring machine 200 includes a measuring table 210, a translation movement mechanism 220, a probe 230, and a rotary table mechanism 250.

The translation movement mechanism 220 includes a gate-shaped Y slider 221, an X slider 222, a Z axis column 223, and a Z spindle 224. The Y slider 221 is provided in such a manner as to be slidable on the measuring table 210 in the Y direction. The X slider 222 slides along a beam of the Y slider 221 in the X direction. The Z axis column 223 is fixed to the X slider 222. The Z spindle 224 moves up and down inside the Z axis column 223 in the Z direction.

On each of the Y slider 221, the X slider 222, and the Z spindle 224, a driving motor (not shown) and an encoder (not shown) are fixed. The driving motors are driven and controlled by a drive control signal from the motion controller 300. The encoders detect the respective movement amounts of the Y slider 221, the X slider 222, and the Z spindle 224 and output the detection values to the motion controller 300. The probe 230 is attached to the lower end of the Z spindle 224.

The probe 230 includes a stylus 231 and a supporting part 233. The stylus 231 includes a stylus tip 232 on the tip side (the −Z axis direction side). The supporting part 233 supports the base end side (+Z axis direction side) of the stylus 231. The stylus tip 232 has a spherical shape and is brought into contact with an object to be measured.

When external force is applied to the stylus 231, that is, when the stylus tip 232 is brought into contact with an object to be measured, the supporting part 233 supports the stylus 231 in such a manner that the stylus 231 is movable in the X, Y, and Z axis directions within a certain range. The supporting part 233 includes a probe sensor (not shown) that detects the position of the stylus 231 in each axis direction. The probe sensor outputs a detection value to the motion controller 300.

The rotary table mechanism 250 is mounted on the measuring table and rotates a rotary table 251 with a built-in motor (not shown). Note that, the rotation axis of the rotary table 251 is parallel with the Z axis. The rotary table mechanism 250 incorporates a rotary encoder (not shown) that outputs a detection value to the motion controller 300.

(Configuration of Host Computer 500)

Next, the host computer 500 is described below.

Figure 5:
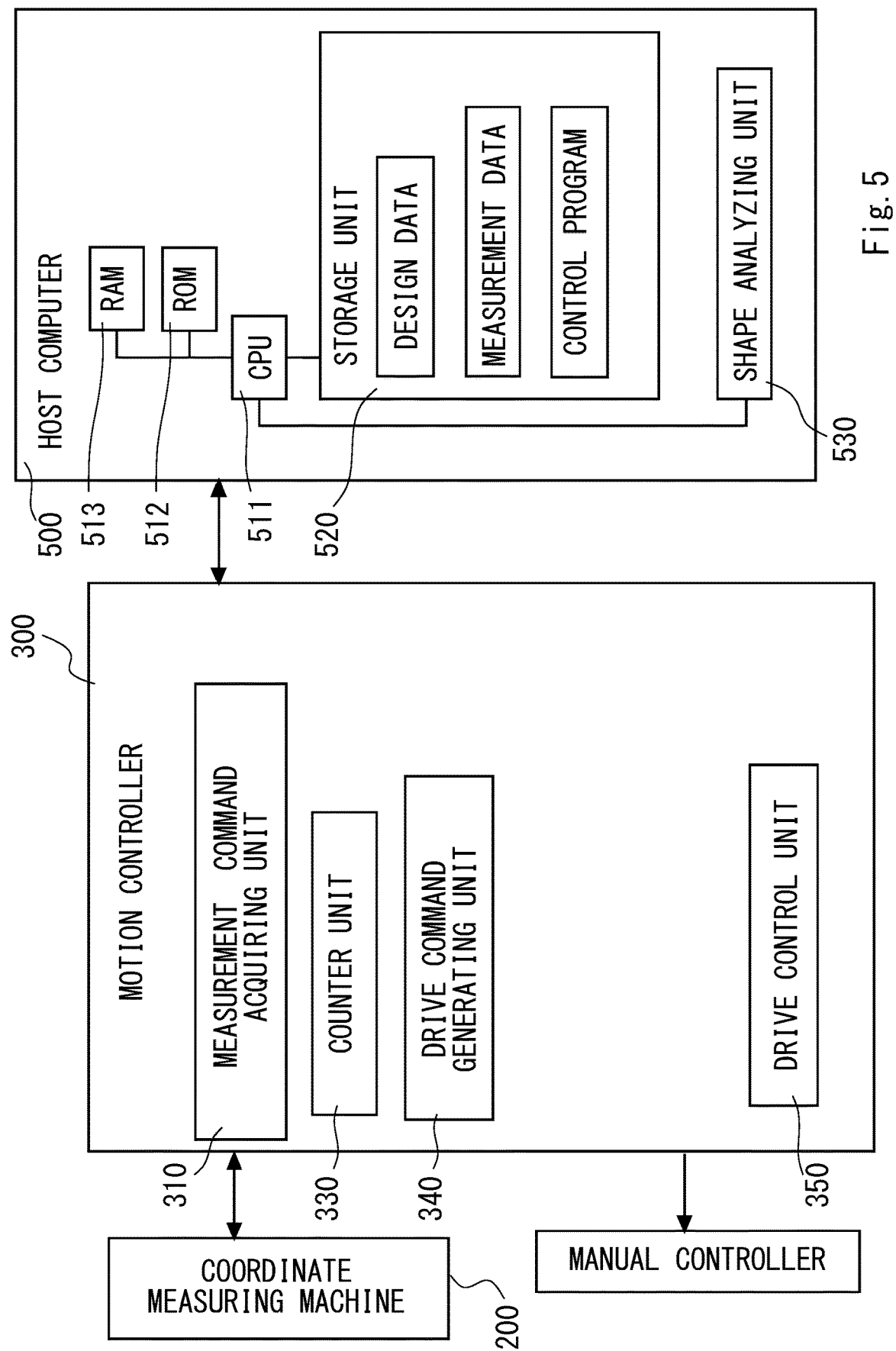
FIG. 5 is a functional block diagram of a host computer and a motion controller.

FIG. 5 is a functional block diagram of the host computer 500 and the motion controller 300. The host computer 500 includes a central processing unit (CPU) 511 and memory and controls the coordinate measuring machine 200 through the motion controller 300. The CPU 511 executes a measurement control program, thereby implementing measurement motion in the present embodiment. The host computer 500 is connected to output devices (a display and a printer) and input devices (a keyboard and a mouse) as needed.

The host computer 500 further includes a storage unit 520 and a shape analyzing unit 530. The storage unit 520 stores design data (CAD data, NURBS data, or the like) regarding the shape of an object to be measured (workpiece) W, measurement data obtained in measurement, and a measurement control program for controlling entire measurement motion.

The shape analyzing unit 530 calculates, based on the measurement data output from the motion controller 300, surface shape data about the object to be measured and performs shape analysis to calculate an error, distortion, or the like of the calculated surface shape data about the object to be measured.

The shape analyzing unit 530 further converts design data (CAD data, NURBS data, or the like) including information about a scanning path into a PCC to generate measurement command data. Here, the generation of measurement command data is described.

Figure 6:
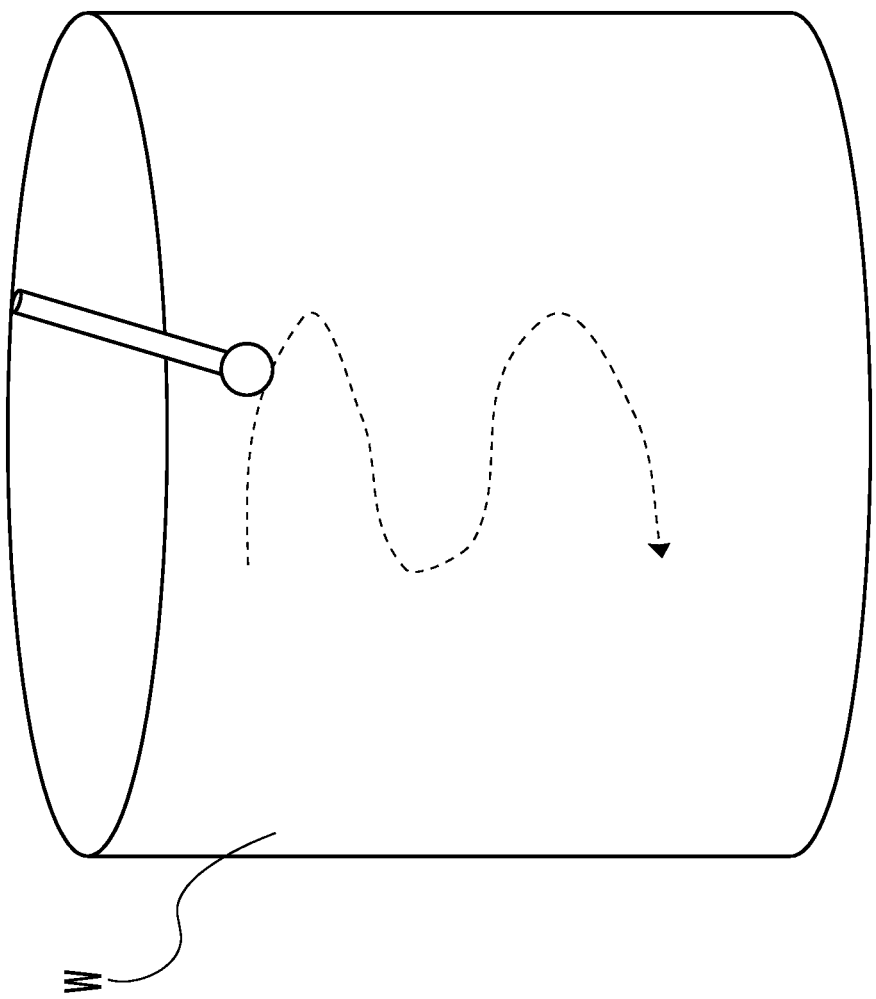
FIG. 6 is a diagram showing an example of a path meandering on a side face of a columnar workpiece (object to be measured) W for performing scanning measurement.

For example, it is assumed that performing scanning measurement on a columnar workpiece (object to be measured) W exemplified in FIG. 6 by meandering on a side face of the workpiece W is desired. In this case, with a conventional technique, an operator has just set a scanning path (meandering path) shown in FIG. 6, and the scanning path has been set as, for example, CAD data. In the present embodiment, an operator inputs information about the scanning path and the rotation angle value of the rotary table 251 at that time as a command value.

Figure 7:
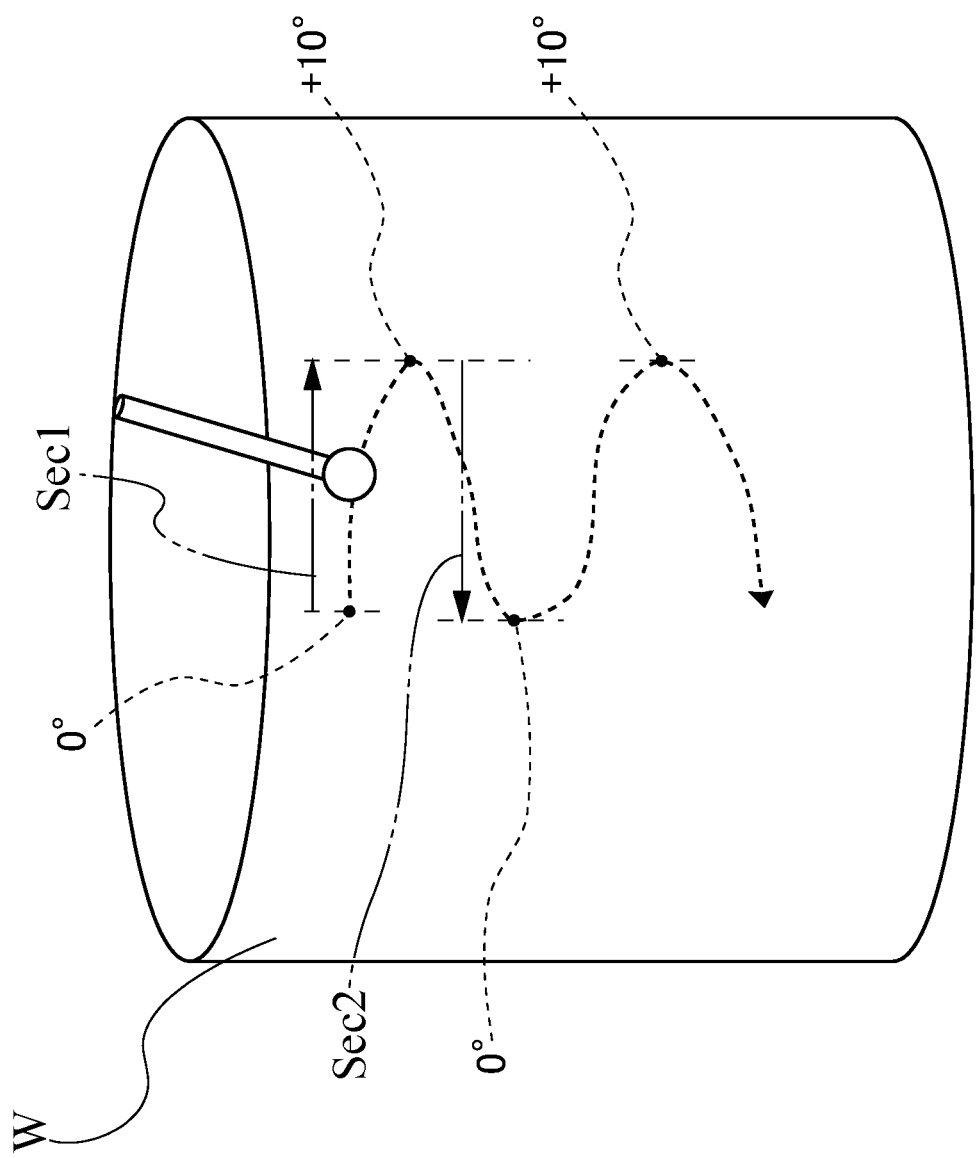
FIG. 7 is a diagram schematically showing that a rotation angle (rotation angle command) is set in a section of a scanning path.

For example, as exemplified in FIG. 7, the scanning path is divided into some sections. Then, for each section, a rotation angle θS of the rotary table 251 for measuring the start point of the section and a rotation angle θF of the rotary table 251 for measuring the end point of the section are set. (The end point of a section is also the start point of the next section.) This rotation angle command is assumed to be embedded in the information about the scanning path in such a manner as to link with the CAD data. In the example of FIG. 7, the rotation angles of the rotary table 251 are set to be "0°" at the start point PS of the first section (section 1), to be "+10°" at the end point PF of the section, and the like. (In actual scanning measurement motion, the rotary table 251 is rotated by 10° while the stylus tip 232 performs scanning movement in the first section.)

The shape analyzing unit 530 converts, with the method as described in the related art, CAD data into point group data (contour point data)→offset contour point data→a PCC.

However, the rotation angle command is extracted from the information about the scanning path and added to the corresponding section of a PCC after the PCC is generated. The data obtained by adding the rotation angle command to the PCC is referred to as "measurement command data" in the present embodiment (see FIG. 8).

(Configuration of Motion Controller 300)

Figure 8:
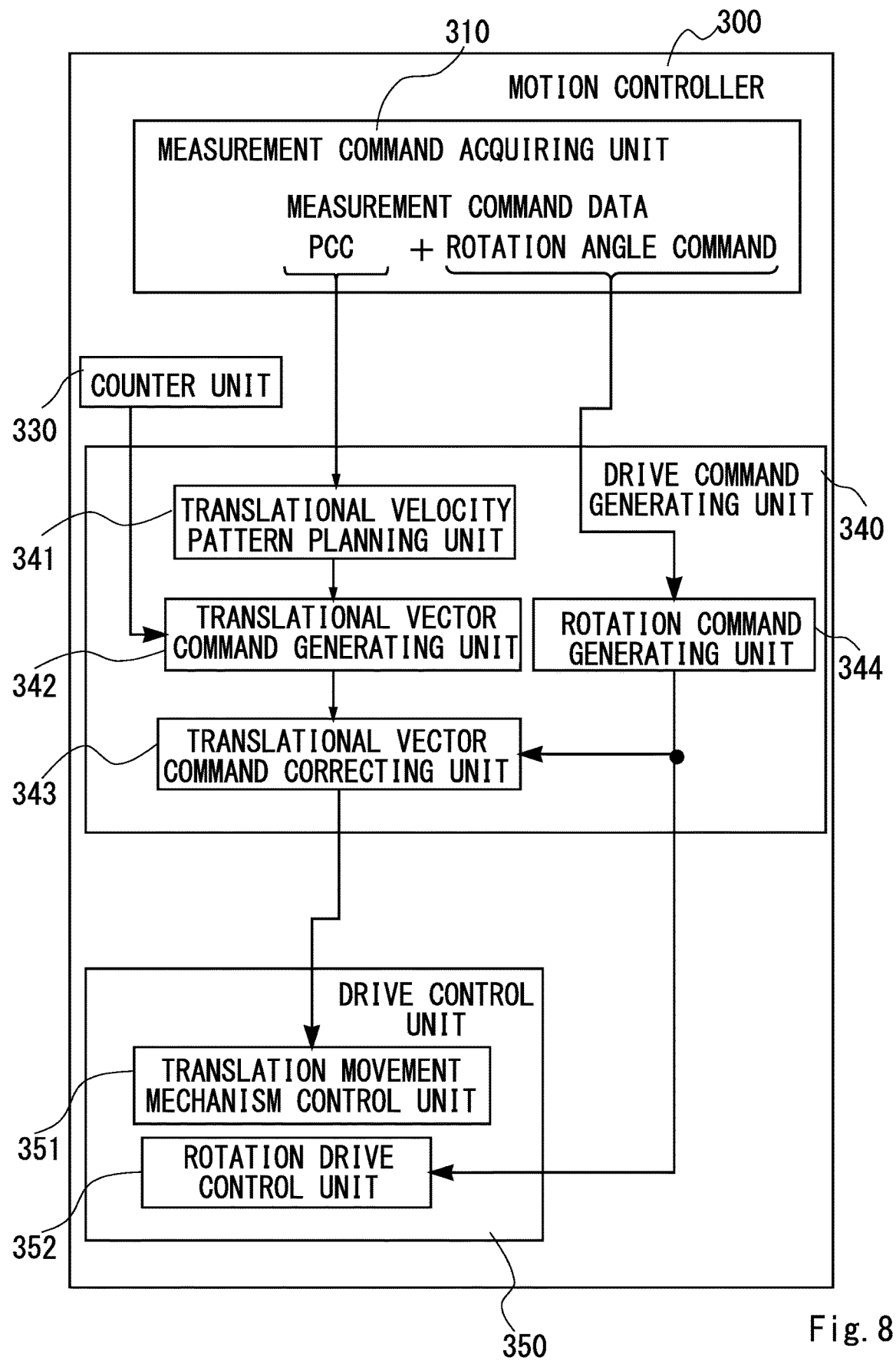
FIG. 8 is a functional block diagram of a motion controller.

FIG. 8 is a functional block diagram of the motion controller 300. The motion controller 300 is described below. The motion controller 300 includes a measurement command acquiring unit 310, a counter unit 330, a drive command generating unit 340, and a drive control unit 350.

The measurement command acquiring unit 310 acquires measurement command data from the host computer 500.

(In the present embodiment, measurement command data is the data obtained by adding a rotation angle command to PCC data.)

The counter unit 330 counts detection signals output from the encoders to measure the displacement amounts of the respective sliders and counts detection signals output from the probe sensor to measure the displacement amount of the probe 230 (the stylus 231).

From the measured displacement amounts of the sliders and the probe 230, a coordinate position PP of the stylus tip 232 (hereinafter, referred to as a probe position PP) is obtained.

In addition, from the displacement amount of the stylus 231 measured by the counter unit 330 (a detection value (Px, Py, Pz) of the probe sensor), the deflection amount of the stylus tip 232 (the absolute value of the vector Ep) is obtained. Similarly, the counter unit 330 counts detection signals detected by the rotary encoder to obtain the rotation angle of the rotary table mechanism 250.

The drive command generating unit 340 includes a translational velocity pattern planning unit 341, a translational vector command generating unit 342, a rotation command generating unit 344, and a translational vector command correcting unit 343.

The measurement command data is obtained by adding a rotation angle command to PCC data.

Figure 9:
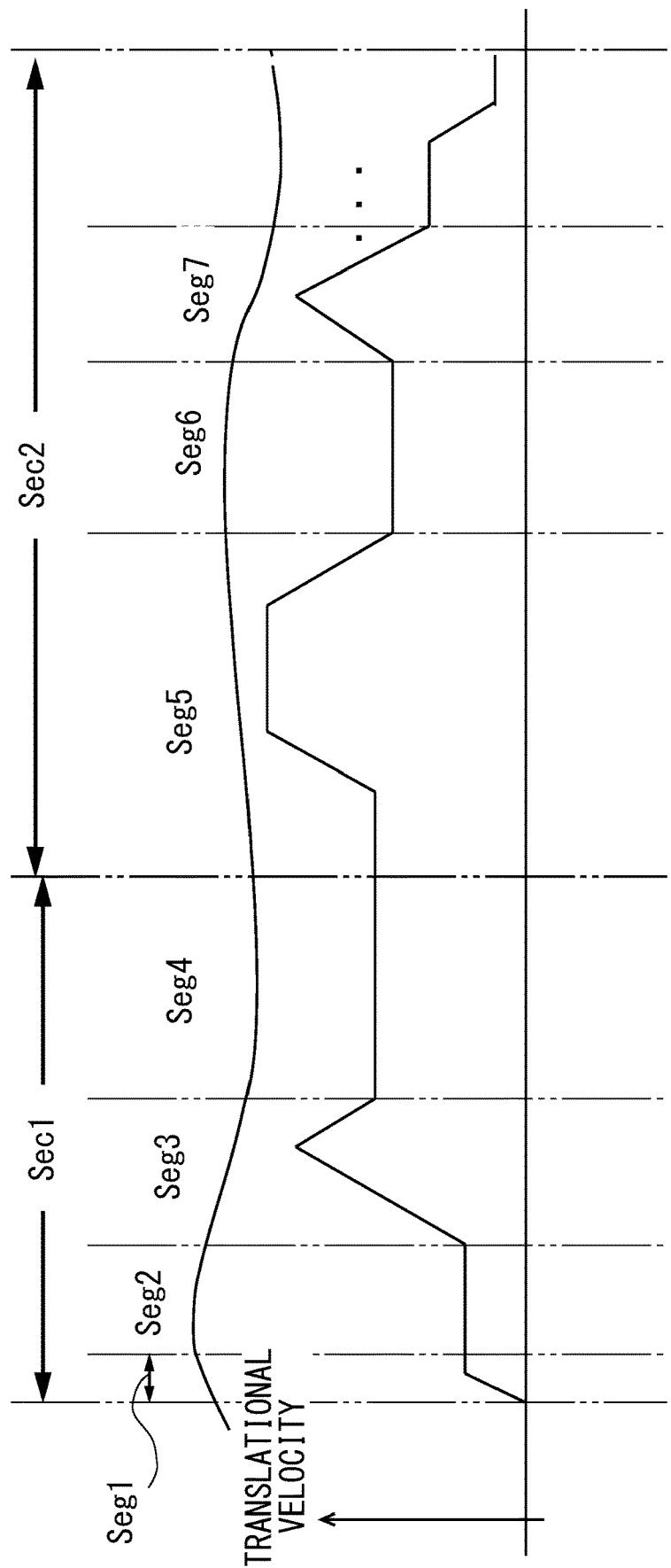
FIG. 9 is a diagram showing an example of a translational velocity pattern.

First, the translational velocity pattern planning unit 341 and the translational vector command generating unit 342 generates a resultant velocity vector V from a PCC as in the conventional manner. That is, the translational velocity pattern planning unit 341 and the translational vector command generating unit 342 also generate a resultant velocity vector V from a PCC in the present embodiment. The translational velocity pattern planning unit 341 divides a PCC into divided PCCs and calculates the velocity curve from the divided PCCs to calculate the moving speed (movement vector) of the probe 230 moved by the translation movement mechanism 220 (see FIG. 9). That is, the moving speed (movement vector) of the probe 230 moved by the translation movement mechanism 220 is set based on the curvature of each segment of the divided PCCs, thereby generating a translational velocity pattern exemplified in FIG. 9. The applicant has detailedly disclosed how the velocity pattern is applied to each segment of divided PCCs and a series of velocity patterns (a velocity plan) shown in FIG. 9 in, for example, JP 6063161 B and the like.

The rotation command generating unit 344 generates a rotation drive command for the rotary table mechanism 250. Here, the rotation drive command for the rotary table mechanism 250 needs to be given not as a coordinate value (angle value) but as a constantly-changing "angular velocity". The rotation command generating unit 344 is required to convert the "rotation angle command" included in the measurement command data into an angular velocity command. In addition, the rotation command generating unit 344 is required to generate a rotation angle command to synchronize the rotation of the rotary table 251 with the movement of the probe 230 by the translation movement mechanism 220 in such a manner that the probe 230 performs scanning measurement on the surface of the workpiece along the scanning path set by the operator.

Figure 10:
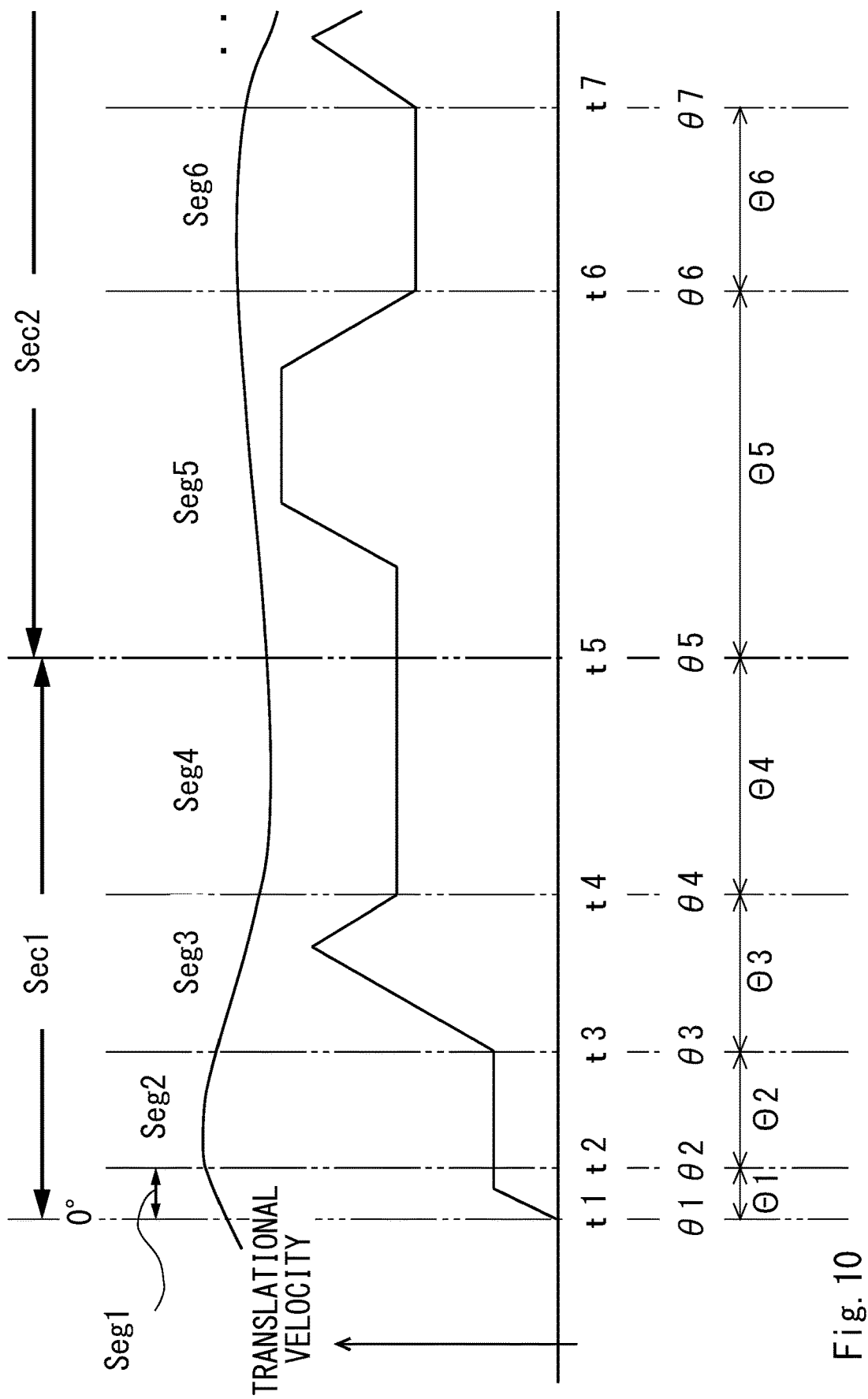
FIG. 10 is a diagram showing an example of a pattern in which angle information is added to the translational velocity pattern.

The rotation command generating unit 344 acquires the measurement command data including the rotation angle command from the measurement command acquiring unit 310 and further acquires the translational velocity pattern (FIG. 9) from the translational velocity pattern planning unit 341. The translational velocity pattern acquired by the rotation command generating unit 344 is shown in FIG. 10. This pattern is the same as the translational velocity pattern in FIG. 9 generated by the translational velocity pattern planning unit 341, but angle information is added thereto. In the measurement command data, the angle of the rotary table 251 at the start point of the section 1 has been set to −10°, and the angle of the rotary table 251 at the end point of the section 1 (the start point of the section 2) has been set to +10°. Here, the translational velocity pattern planning unit 341 has divided the scanning path (the corrected PCC) into a plurality of segments and applied the translational velocity pattern to each segment. The rotation command generating unit 344 sets an angular velocity pattern for each segment of the translational velocity pattern to synchronize the translation movement of the probe 230 by the translation movement mechanism 220 with the rotation movement of the rotary table 251.

Figure 11:
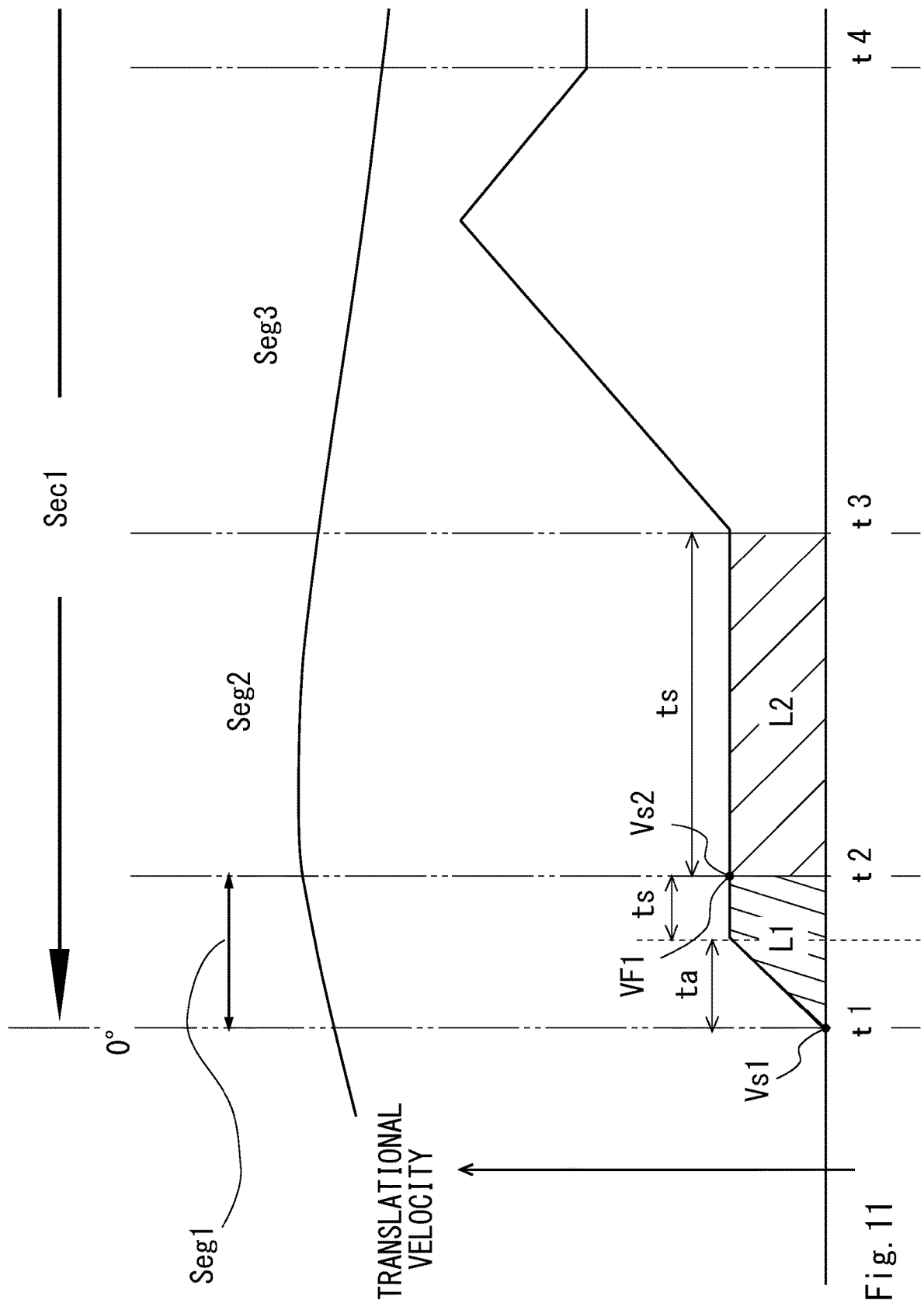
FIG. 11 is a diagram showing that a moving distance Li, a start velocity Vsi, an acceleration/deceleration time ta, a constant velocity time tc, a final velocity VFi, a start time ts, and an end time tf of each segment are added to the translational velocity pattern.

When the translational velocity pattern planning unit 341 generates the translational velocity pattern, a moving distance Li, a start velocity Vsi, an acceleration/deceleration time ta, a constant velocity time tc, and a final velocity VFi are calculated for each segment Seg(i) (see FIG. 11).

Since the acceleration/deceleration time ta and the constant velocity time tc have been calculated for each segment Seg(i), the start time is and the end time tf of each segment are known, and a time T required for each segment Seg(i) (segment moving time Tseg) is also known.

The rotation command generating unit 344 allocates, based on the information, angle information to each segment Seg(i).

The rotation command generating unit 344 calculates, for each segment, a rotation angle value θs at the start of the segment and a rotation angle value θf at the end of the segment.

The angle of the rotary table 251 at the start point of the section 1 has been set to 10°, and the angle of the rotary table 251 at the end point of the section 1 has been set to +10°.

Here, the section 1 has been divided by the translational velocity pattern planning unit 341 into the segment 1 to the segment 4. Thus, the rotation command generating unit 344 proportionally distributes the total rotation amount (in this specification, 10°) during the section 1 according to the time required for each segment (segment moving time T). Accordingly, the rotation angles θ1, θ2, θ3, and the like of the rotary table 251 at the start points and the end points of the segments are obtained as exemplified in FIG. 10. Then, the rotation amount Θ of the rotary table 251 during each segment (segment rotation amount Θ) is also obtained.

The rotation command generating unit 344 applies an angular velocity command pattern to each segment. At this time, the rotation command generating unit 344 sequentially applies the angular velocity command pattern to the first segment Seg1 in order. This is because that an end angular velocity $\omega_F$ of the previous segment Seg(i−1) becomes a start angular velocity $\omega_s$ of the next segment Seg(i).

Figure 12:
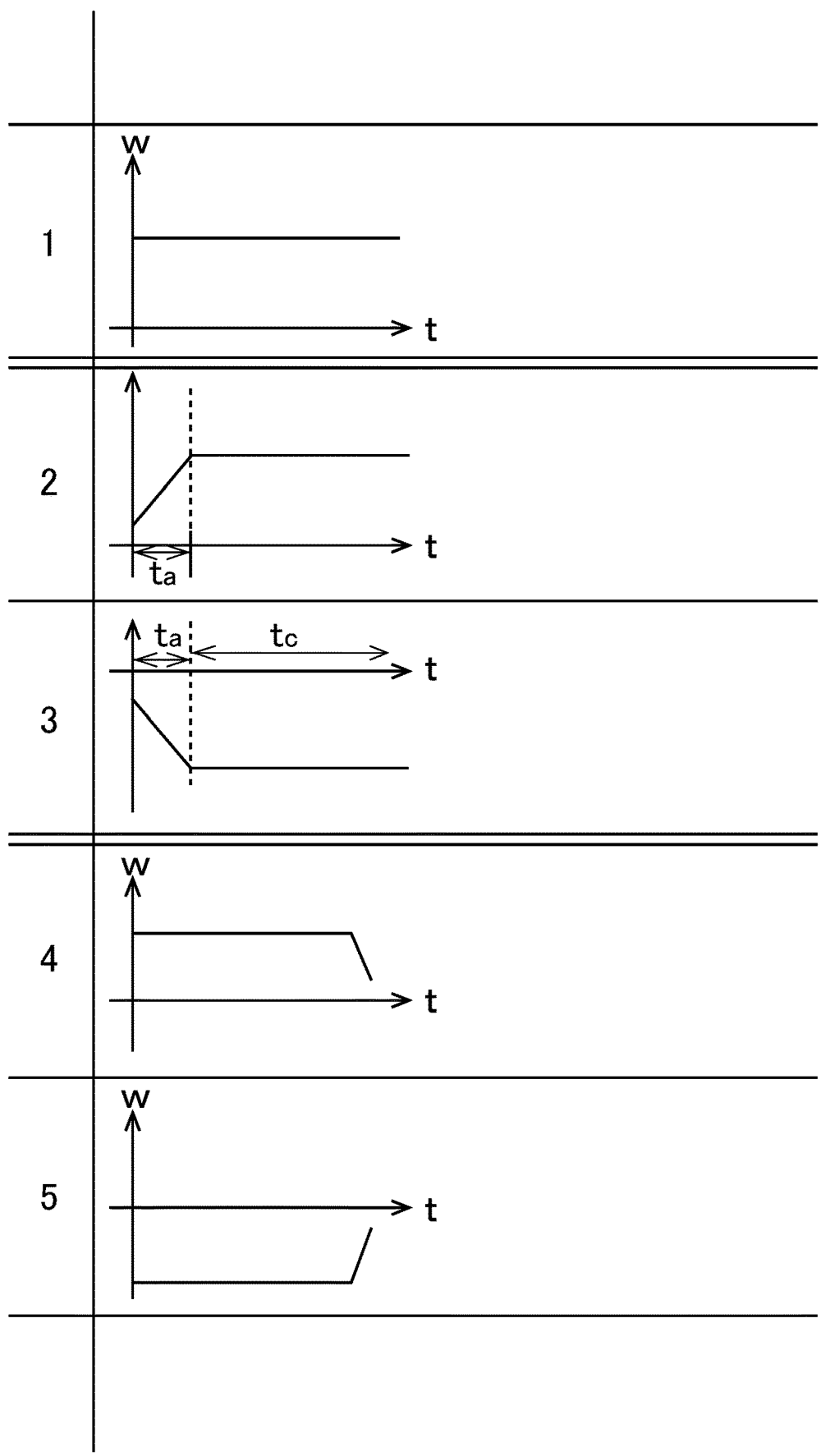
FIG. 12 is a diagram showing examples of angular velocity patterns to be applied to each segment.

Here, as angular velocity patterns to be applied to each segment, five patterns shown in FIG. 12 are prepared.

The first angular velocity pattern is an angular velocity pattern for rotating the rotary table 251 at a constant angular velocity ω.

The start angular velocity $\omega_s$ of a segment is determined by the angular velocity pattern of the previous segment Seg(i−1). That is, the end angular velocity $\omega_F$ of the previous segment Seg(i−1) is the start angular velocity of the next segment Seg(i), and the start angular velocity $\omega_s$ is maintained if the first angular velocity pattern is applied. If $\omega_s \times T = \Theta$ holds, the first angular velocity pattern is applicable.

The second and third angular velocity patterns are angular velocity pattern for accelerating initially and then maintaining the constant angular velocity ω.

Here, "accelerating" means increasing the absolute value of an angular velocity

If the left rotating direction is the positive direction, accelerating in the right rotating direction means "decelerating", but this is considered to be "accelerating" in the negative direction. Then, taking into consideration, for example, the magnitude of the angular velocity ω (rotation speed), the second and third angular velocity patterns can be regarded to be the same because both patterns each have an adjustment period ta for increasing the rotation speed initially and then have a period for a constant rotation speed. (That is, the two patterns have a difference only in the rotating direction).

Here, it is assumed that the first angular velocity pattern is applied to a segment Seg(i), but the pattern is insufficient for the segment rotation amount Θ. At this time, the acceleration time is represented as ta, and the constant velocity time is represented as tc, and the following simultaneous equations is solved.

$$ta+tc=T$$

$$\omega_s \cdot ta + (\alpha \cdot ta^2/2) + \omega_F \cdot tc = \Theta$$

$$\omega_F = \omega_s + \alpha \cdot ta$$

In the equations, α is (the magnitude of) the acceleration of the rotary table 251, and the magnitude of the acceleration of the rotary table 251 is assumed to be fixed to a predetermined value. That is, the rotary table 251 accelerates or decelerates as fast as possible to reach a target angular velocity and keeps a constant angular velocity as long as possible. (The magnitude of the acceleration is not adjusted.) Incidentally, the magnitude of the acceleration α is preferably set to be about half the resistance to the acceleration of the rotary table 251. This is because that the acceleration/deceleration curve is converted into an S-shaped curve for smooth acceleration/deceleration control in the actual motion control although calculation on the assumption that the rotary table 251 accelerates linearly is efficient when an angular velocity pattern (velocity pattern) is generated.

By solving the above equations, the acceleration time ta, the constant velocity time tc, and the end angular velocity $\omega_F$ are obtained. Note that, in the second and third patterns, the case of keeping accelerating is allowed.

This is the case of ta=T(tc=0).

The fourth and fifth angular velocity pattern are angular velocity patterns in which the rotary table 251 rotates at the constant angular velocity $\omega_s$ initially and then decelerates.

Here, it is assumed that the first angular velocity pattern is applied to a segment Seg(i), but the segment rotation amount Θ is exceeded.

At this time, the constant velocity time is represented as tc, the deceleration time is represented as ta, and the following simultaneous equations are solved.

$$ta+tc=T$$

$$\omega_s \cdot tc + \omega_s \cdot ta - (\alpha \cdot ta^2/2) = \Theta$$

$$\omega_F = \omega_s - \alpha \cdot ta$$

By solving the above equations, the constant velocity time tc, the deceleration time ta, and the end angular velocity $\omega_F$ are obtained. Note that, in the fourth and fifth patterns, the case of keeping decelerating is permitted.

This is the case of ta=T(tc=0).

Figure 13:
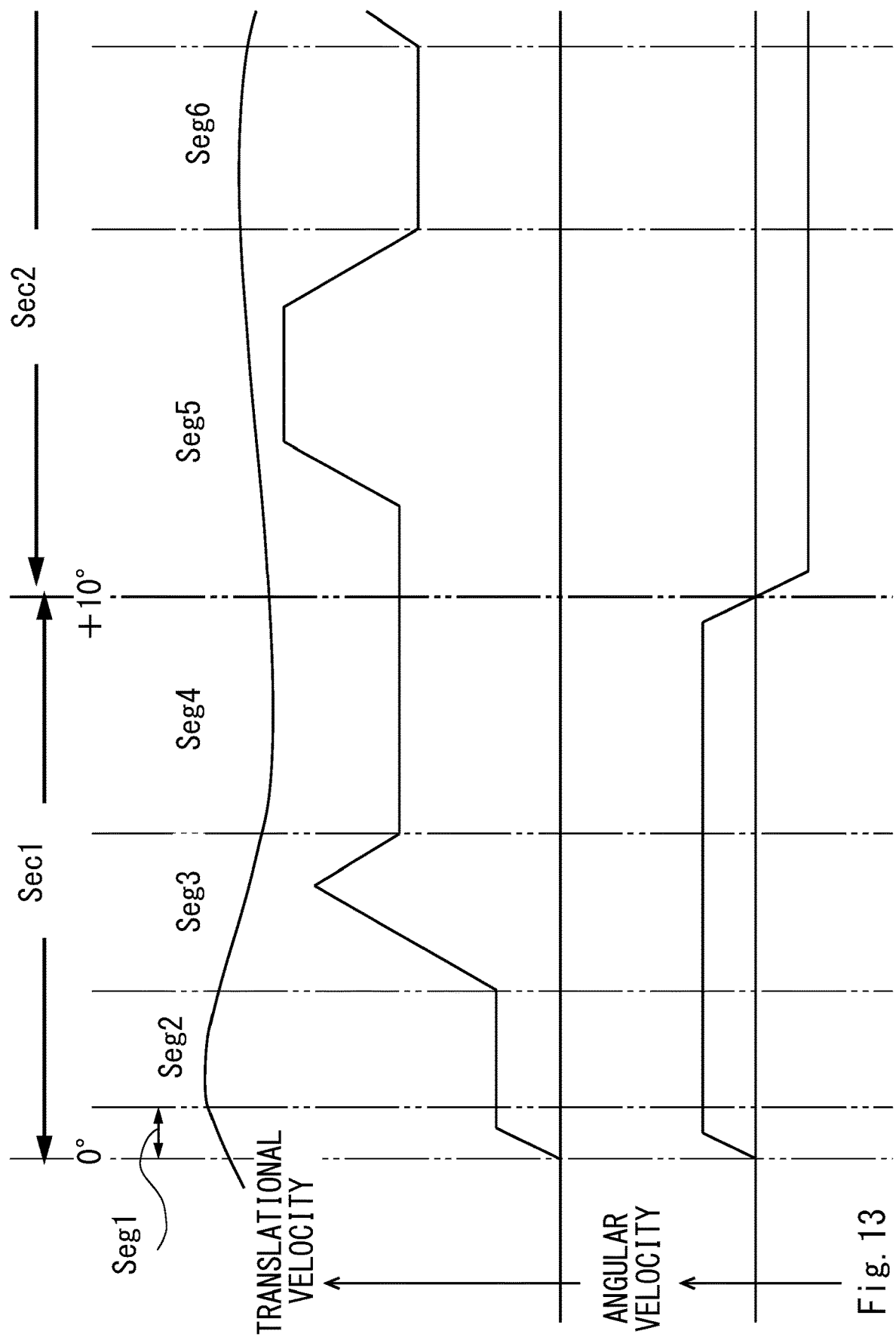
FIG. 13 is a diagram showing an example of an angular velocity pattern of a rotary table synchronized with a probe moved by a translation movement mechanism.

In this manner, when angular velocity patterns are sequentially calculated from the first segment, the angular velocity pattern of the rotary table 251 synchronized with the movement of the probe 230 by the translation movement mechanism 220 is obtained as shown in FIG. 13.

After generating the translational velocity pattern, the translational velocity pattern planning unit 341 combines the adjacent segments to perform blocking (JP 6063161 B), but the rotation command generating unit 344 preferably applies, based on the translational velocity pattern before being blocked, the angular velocity pattern to each segment. It can be possible that the angular velocity pattern is applied to the blocked translational velocity pattern in a block unit, but the angular velocity pattern of the rotary table 251 cannot be properly obtained if a block unit becomes large. It can be also possible that the angular acceleration α is variable or that more angular velocity patterns are prepared (for example, JP 6063161 B), but the calculation becomes greatly complicated. In the present embodiment, the angular velocity pattern is applied to each segment based on the translational velocity pattern before being blocked, and the angular velocity pattern is applied with simple calculation by reducing the number of angular velocity patterns and setting the magnitude of the acceleration to be constant. In addition, since applying the angular velocity pattern to each segment increases the number of sections, synchronization is easily performed. Note that, the main purpose of the rotary table 251 to rotate a workpiece W is to avoid the interference between the probe 230 and the workpiece W, and the interference can be basically avoided when the workpiece W is rotated for a certain time in a certain direction at a certain angular velocity. Complicated and delicate motion is mainly implemented by the translation movement mechanism 220 moving the probe along the corrected PCC and deflection-control in active scanning measurement.

Note that, in order to drive and control the rotary table 251, angular velocity patterns are preferably blocked. For example, all the segments Seg1 to Seg6 shown in FIG. 13 may be blocked. For example, since the deceleration in the latter half of the segment Seg4 and the acceleration in the former half of the segment Seg5 is the same acceleration, they are preferably handled as a series of acceleration time.

The translational vector command generating unit 342 generates, as described in the related art, a resultant velocity vector V based on the set scanning path information (here, the corrected PCC) and the translational velocity pattern (translational velocity plan) shown in FIG. 11.

$$V = Gf \times Vf + Ge \times Ve + Gc \times Vc \quad \text{(Expression 1)}$$

The translational vector command correcting unit 343 corrects the resultant vector V generated by the translational vector command generating unit 342 to reduce the rotation amount of the rotary table 251 and generates a rotation-corrected resultant velocity vector $V_{AMD}$ (a corrected translational velocity vector command). Here, it is assumed that the translation movement mechanism 220 does not move the probe 230 in the right direction (arrow A), but the rotary table 251 rotates in the left direction (arrow B) in FIG. 14 instead. At this time, the resultant vector V is corrected to reduce the rotation amount of the rotary table 251.

Figure 14:
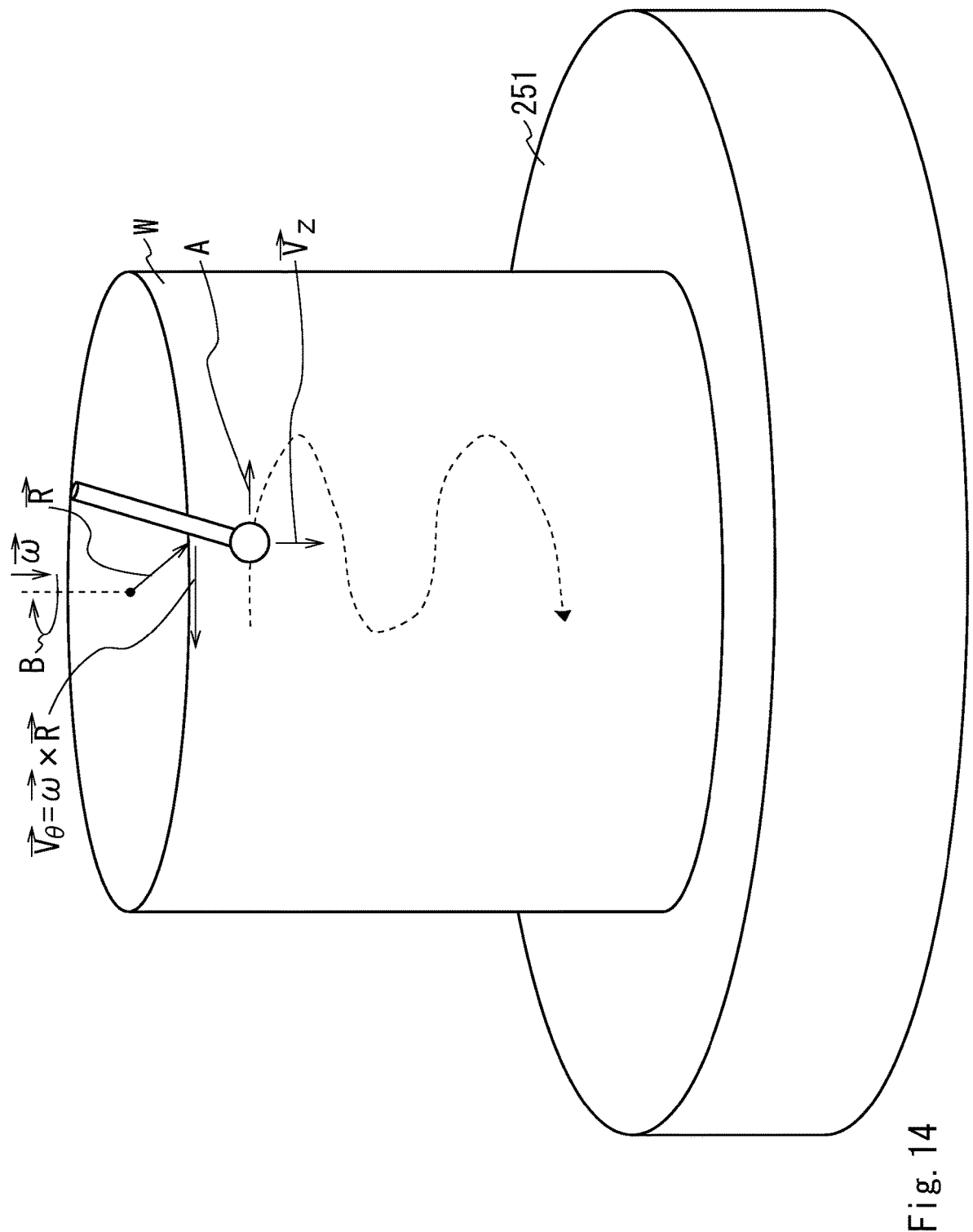
FIG. 14 is a diagram showing an example of scanning measurement motion.

Thus, the vector directed from the rotation axis of the rotary table 251 to the probe 230 (the stylus tip 232) in the state of FIG. 14 is referred to as a radius vector R. In addition, the angular velocity vector of the rotary table 251 is represented as ω.

The velocity (vector) of the rotary table 251 at the position of the probe 230 (the stylus tip 232) is represented as Vθ=ω×R, and the rotation-corrected resultant velocity vector $V_{AMD}$ is represented as follows by reducing Vθ from the resultant velocity vector V.

rotation-corrected resultant velocity vector
$$V_{AMD} = Gf \times Vf + Ge \times Ve + Gc \times Vc - G\theta \times V\theta$$

The drive control unit 350 includes a translation movement mechanism control unit 351 that drives and controls the translation movement mechanism 220 and a rotation drive control unit 352 that drives and controls the rotary table mechanism 250 (see FIG. 8).

To the translation movement mechanism control unit 351, the translational vector command correcting unit 343 supplies a rotation-corrected resultant velocity vector $V_{AMD}$.

To the rotation drive control unit 352, the rotation command generating unit 344 supplies an angular velocity command as a rotation drive command.

The correspondence (link) between the resultant velocity vector based on the translational velocity pattern and the rotation drive command (angular velocity command) based on the angular velocity pattern is maintained, and the rotation-corrected resultant velocity vector $V_{AMD}$ and the rotation drive command synchronized with each other are supplied to the translation movement mechanism control unit 351 and the rotation drive control unit 352, respectively. Then, the translation movement mechanism control unit 351 supplies a translation movement signal based on the rotation-corrected resultant velocity vector $V_{AMD}$ to the translation movement mechanism 220, and the rotation drive control unit 352 supplies a rotation drive signal based on the rotation drive command to the rotary table mechanism 250, and the signals are synchronized with each other.

Figure 15:
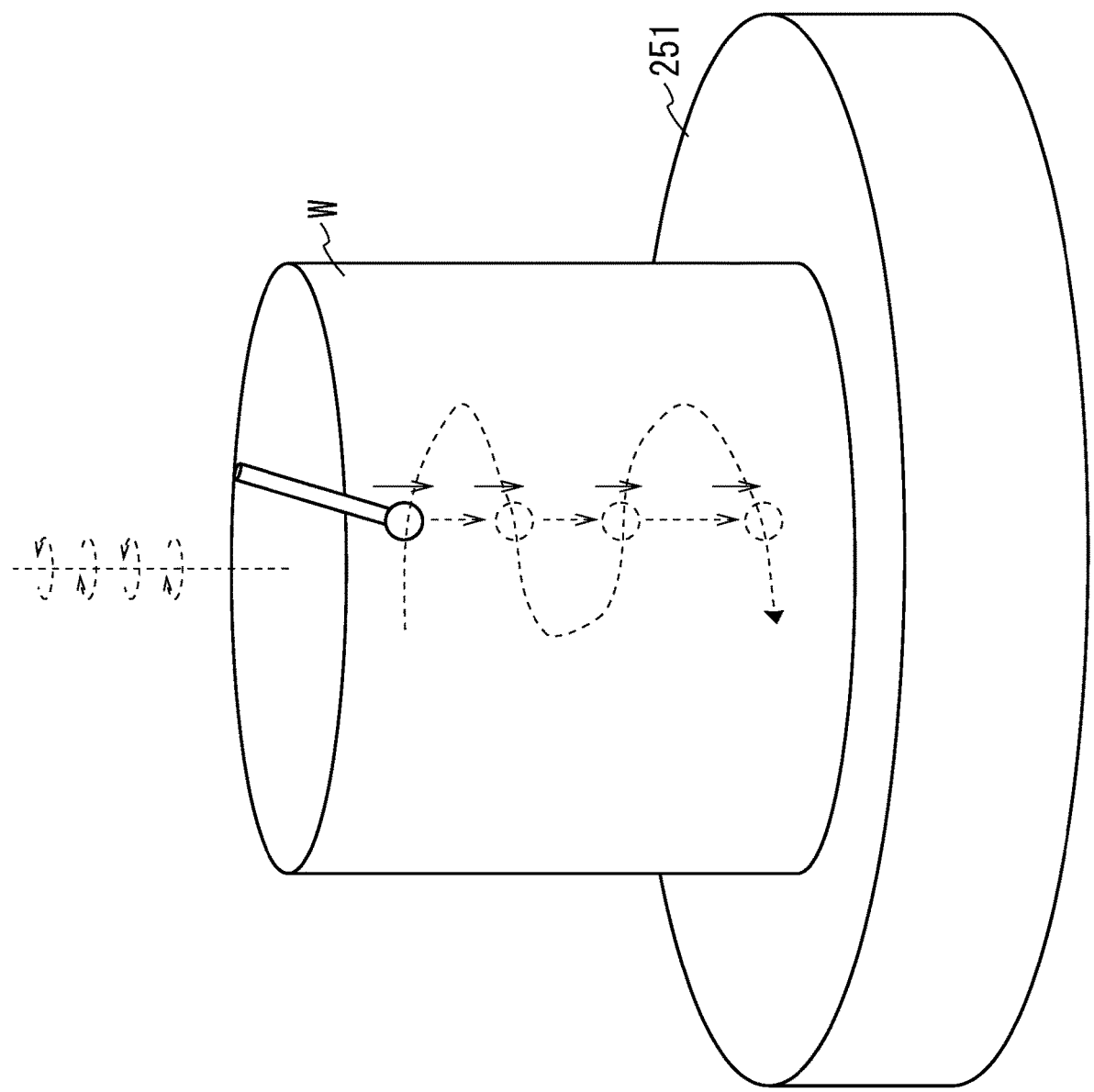
FIG. 15 is a diagram showing an example of scanning measurement motion.

The movement signal and rotation drive signal generated in this manner drive the translation movement mechanism 220 and the rotary table mechanism 250, thereby obtaining, for example, scanning measurement motion as shown in FIG. 15. That is, the probe 230 moved by the translation movement mechanism 220 is, for example, just to lower straight in the Z axis direction. The rotary table 251 rotates clockwise or counterclockwise according to the movement of the probe 230. As a result, scanning measurement is performed with a path meandering on the side face of the columnar workpiece W.

As measurement data, the three-dimensional coordinates of the stylus tip 232 are acquired by the encoder of the probe 230 and the encoder of the translation movement mechanism 220, and the rotation amount of the rotary table mechanism 250 is acquired by the rotary encoder. To analyze the shape of the workpiece (object to be measured) W, the rotation amount of the rotary table mechanism 250 is necessarily considered.

According to the present embodiment with such a configuration, it is possible to perform scanning measurement utilizing the rotation of the rotary table mechanism 250.

The probe 230 and a workpiece W are relatively moved with three drive axes that are orthogonal to each other in a conventional coordinate measuring machine, but the probe 230 and a workpiece W are relatively moved with four axes including, in addition to the three axes, the rotation axis of the rotary table mechanism 250 in the present embodiment. In this manner, the translation movement mechanism 220 having the three axes that are orthogonal to each other cooperates with the rotary table mechanism 250 that are rotated and driven, and it is possible to reduce and simplify the motion of the probe 230. This can shorten the measurement time and improve the measurement efficiency when scanning measurement is performed on a workpiece having a complicated shape with a complicated scanning path.

In the case of a roundness measuring machine as a comparative example, the probe of the roundness measuring machine moves forward and backward only in the XZ plane. Alternatively, the movable direction of the probe is limited to a predetermined restriction face. In addition, a rotation command for the rotary table mechanism and a movement command for the translation movement mechanism are not synchronized to be supplied. The rotary table mechanism and the translation movement mechanism are separately driven, and only the results of the two mechanisms are combined.

In contrast, the rotary table mechanism is fixed to the coordinate measuring machine in the present invention. The probe can naturally move in the Y direction. By synchronizing a rotation command for the rotary table mechanism with a movement command for the translation movement mechanism, scanning measurement is performed with a desired scanning path. At this time, by utilizing the rotation of the rotary table mechanism, the movement amount of the probe of the translation movement mechanism can be reduced.

There has been a coordinate measuring machine including both a translation movement mechanism and a rotary table mechanism. As a rotary table mechanism, there is a rotary table in the present embodiment, and there is also a known multiaxial probe having a rotation drive axis. However, it is difficult for an operator to write a scanning measurement command including rotating motion as a part program, and many restrictions are imposed. Especially, it is difficult to supply a rotation command as an angular velocity.

When scanning measurement is performed on a workpiece by combining a translation movement mechanism and a rotary table mechanism, a measurement part program for causing the translation movement mechanism to move the probe to a desired position and to stop the translation movement and then causing the rotary table mechanism to rotate the probe or the rotary table at a predetermined angular velocity is usually written. In order for the coordinate measuring machine to perform scanning measurement motion along a rather complicated path while synchronizing the translation movement with the rotation movement, it is desirable that angle information to be embedded in scanning path information is an angle value similar to a coordinate command for the coordinate measuring machine.

However, the rotation command to be supplied to the rotary table mechanism 250 is an angular velocity, and the rotation command generating unit 344 is required to generate an angular velocity command. In this regard, according to the present embodiment, as long as the operator just sets angle information in the scanning path, the rotation command generating unit 344 generates an angular velocity pattern synchronized with a translational velocity pattern, and scanning measurement in which translation drive and rotation drive are synchronized is performed.

Second Exemplary Embodiment

In the first exemplary embodiment, a process of the rotation command generating unit 344 for generating an angular velocity pattern is described.

Here, the end point of scanning measurement is considered.

When the tip of the probe 230 (the stylus tip 232) reaches the end point of a set scanning path, the movement of the probe 230 by the translation movement mechanism 220 and the rotation drive of the rotary table 251 are desired to sharply stop.

Figure 16:
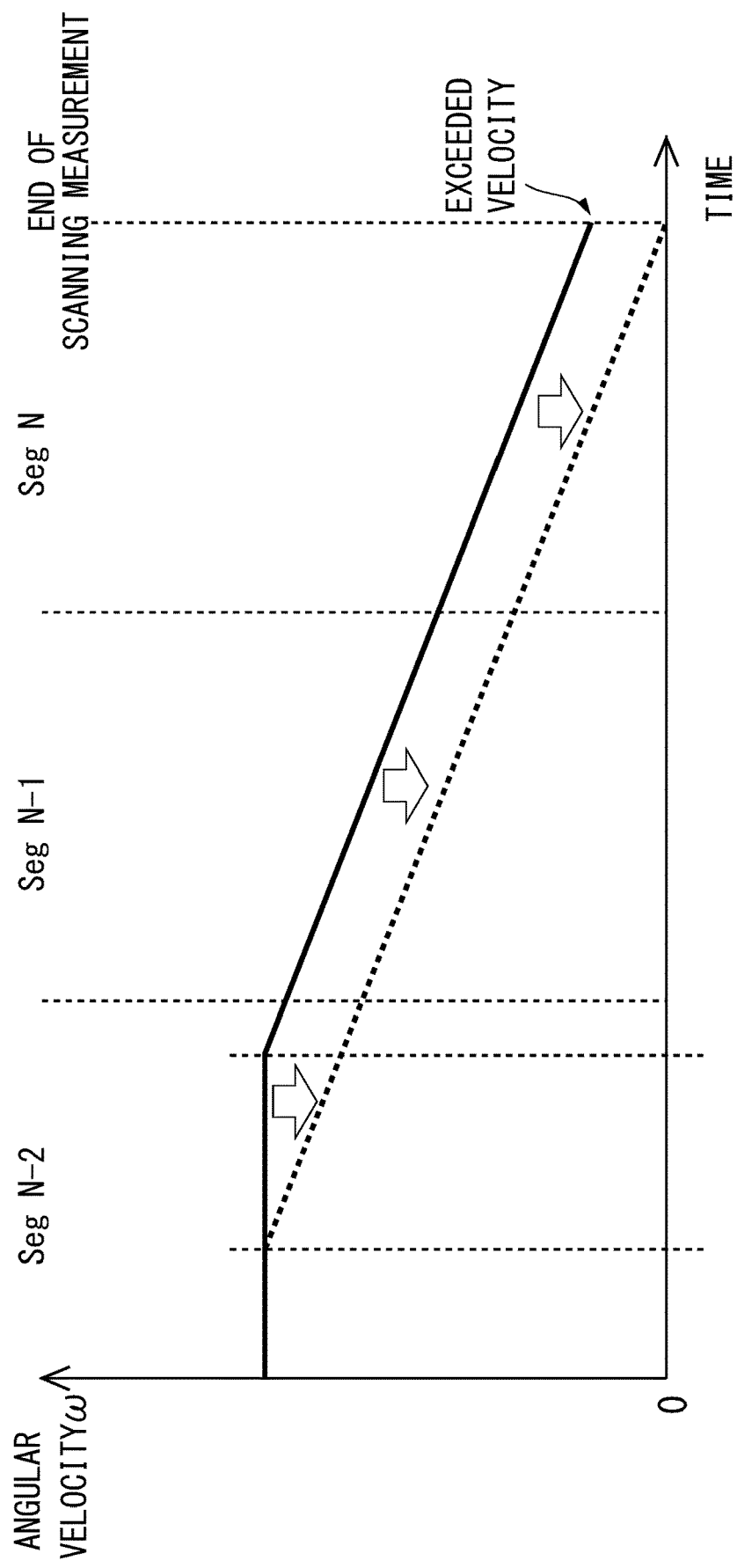
FIG. 16 is a diagram showing an angular velocity pattern needing to be corrected.

A velocity pattern for the translation movement mechanism 220 and the rotary table 251 to decelerate in the last segment to stop at the end point of the scanning path is generated, but the angular velocity cannot be sufficiently decreased in the last segment to be zero at the end point of the scanning path. For this reason, the rotation command generating unit 344 temporally generates an angular velocity pattern for all the segments including the last segment and calculates, if the angular velocity is not sufficiently decreased to zero at the end point, a deceleration time (deceleration distance) necessary for the stop to correct the angular velocity pattern. For example, the first-generated angular velocity pattern is represented in the solid line shown in FIG. 16, and its velocity is exceeded at the end point. In this case, the angular velocity pattern is corrected to start decelerating from one segment, or two segments if necessary, before the end point in such a manner that the angular velocity is to be zero at the end point. With this process for correcting the angular velocity pattern, when the probe 230 reaches the end point of the scanning path, the movement of the probe 230 by the translation movement mechanism 220 and the rotation of the rotary table 251 stop as the operator intends.

Third Exemplary Embodiment

In a third exemplary embodiment, S-shaped acceleration/deceleration processing is described.

Figure 17:
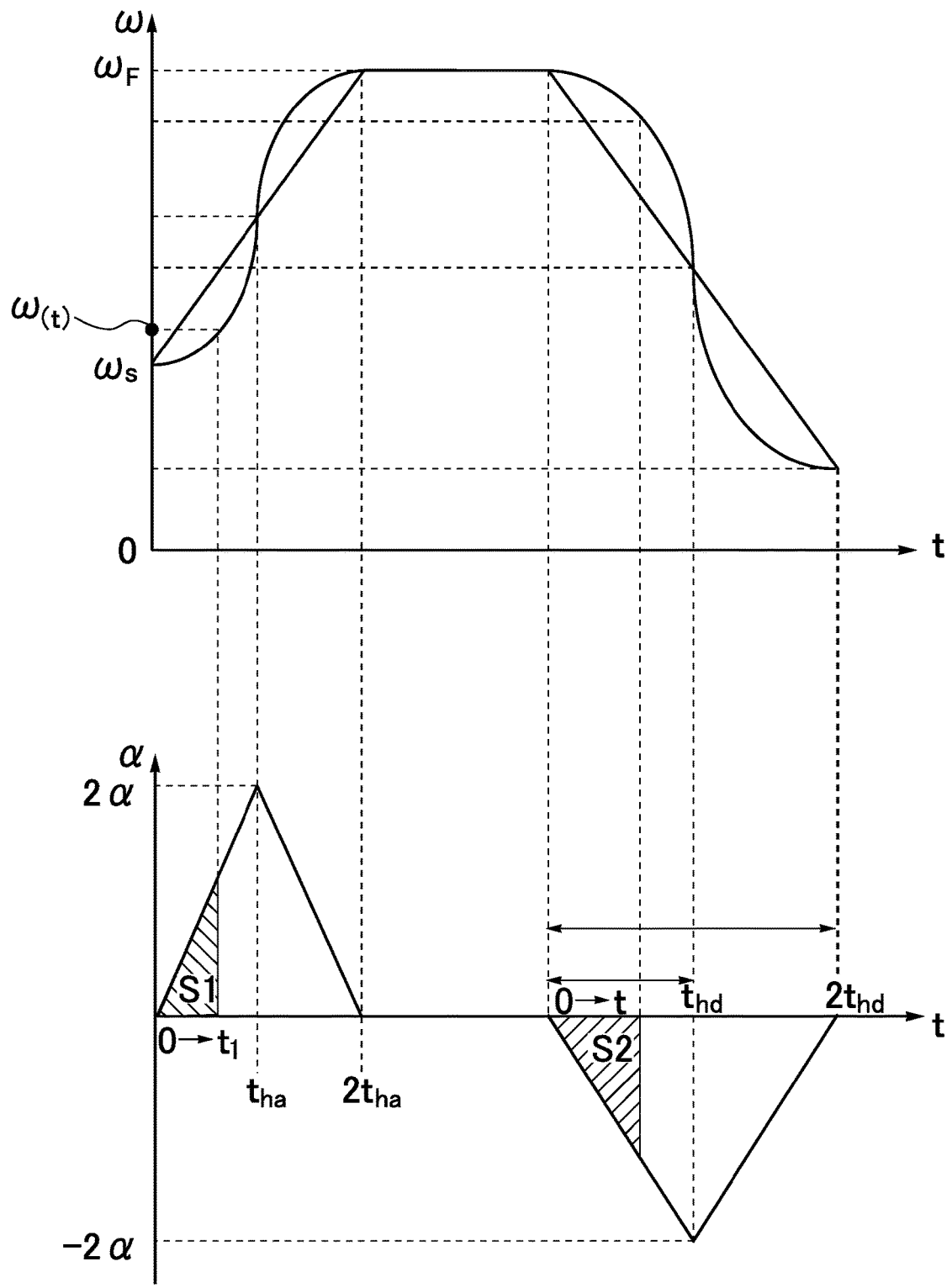
FIG. 17 is a diagram showing that S-shaped acceleration/deceleration processing is being performed on a velocity pattern given by a linear function.
Figure 18:
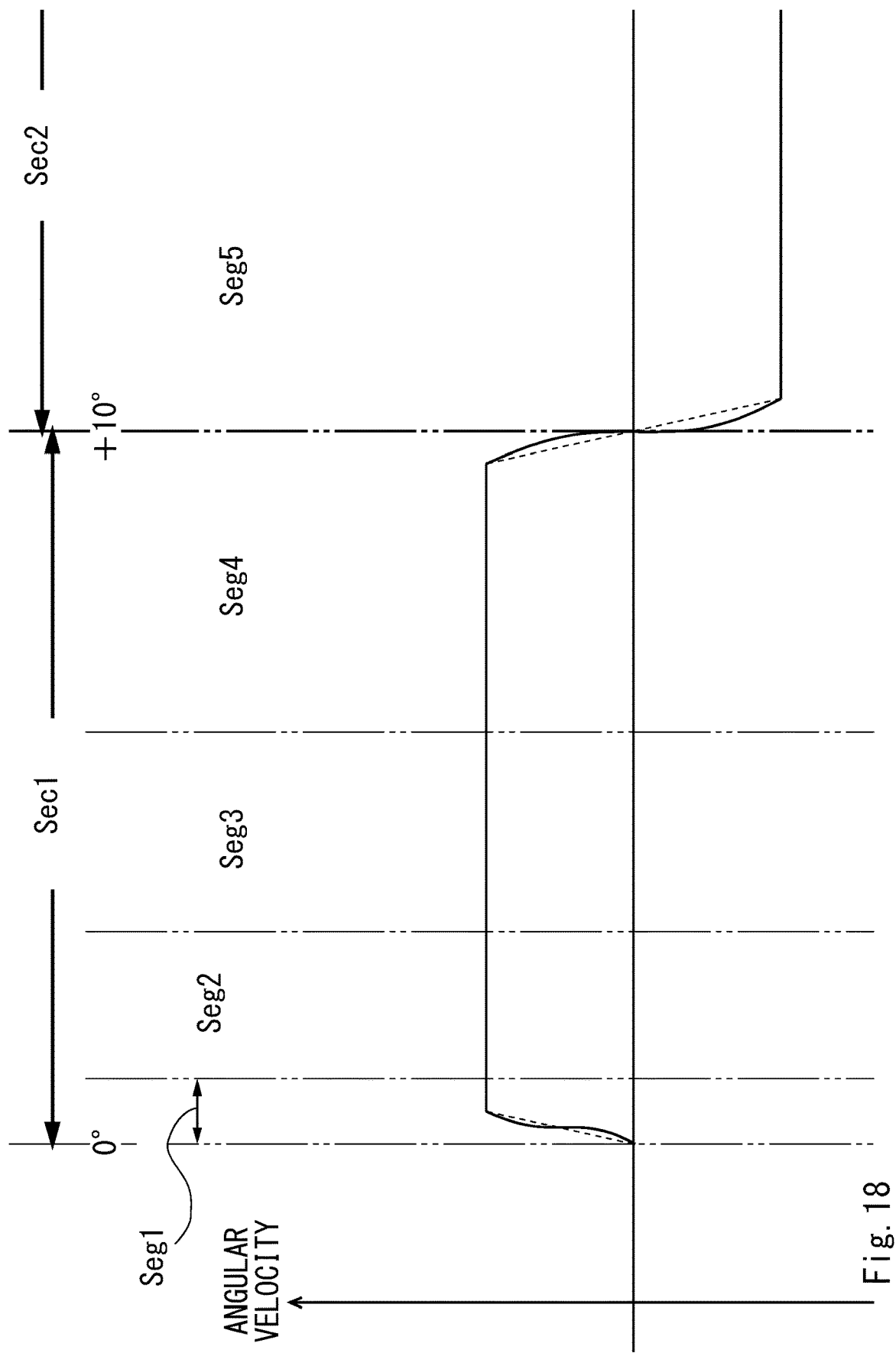
FIG. 18 is a diagram showing that S-shaped acceleration/deceleration processing has been performed on the velocity pattern given by a linear function.

In the first exemplary embodiment, the angular acceleration $\alpha$ is set to a predetermined fixed value, and the angular velocity at an accelerating/decelerating time is a linear function with respect to time. However, it is preferable that the angular velocity gradually accelerates and gradually decelerates in the control of the rotary table. Performing S-shaped acceleration/deceleration processing on a velocity pattern given by a linear function has been disclosed in JP 6050636 B by the applicant (for example, see FIG. 17). With the S-shaped acceleration/deceleration processing, it is possible to smoothly rotate the rotary table and to obtain an angular velocity pattern for smoothly changing a rotating direction as exemplified in FIG. 18 by, for example, blocking the segments Seg4 and Seg5 of the angular velocity pattern shown in FIG. 13 to be connected and then performing the S-shaped acceleration/deceleration processing.

Modified Example 1

In the above embodiments, only one rotation axis of the rotary table mechanism is provided, but two or more rotation axes may be provided.

Figure 19:
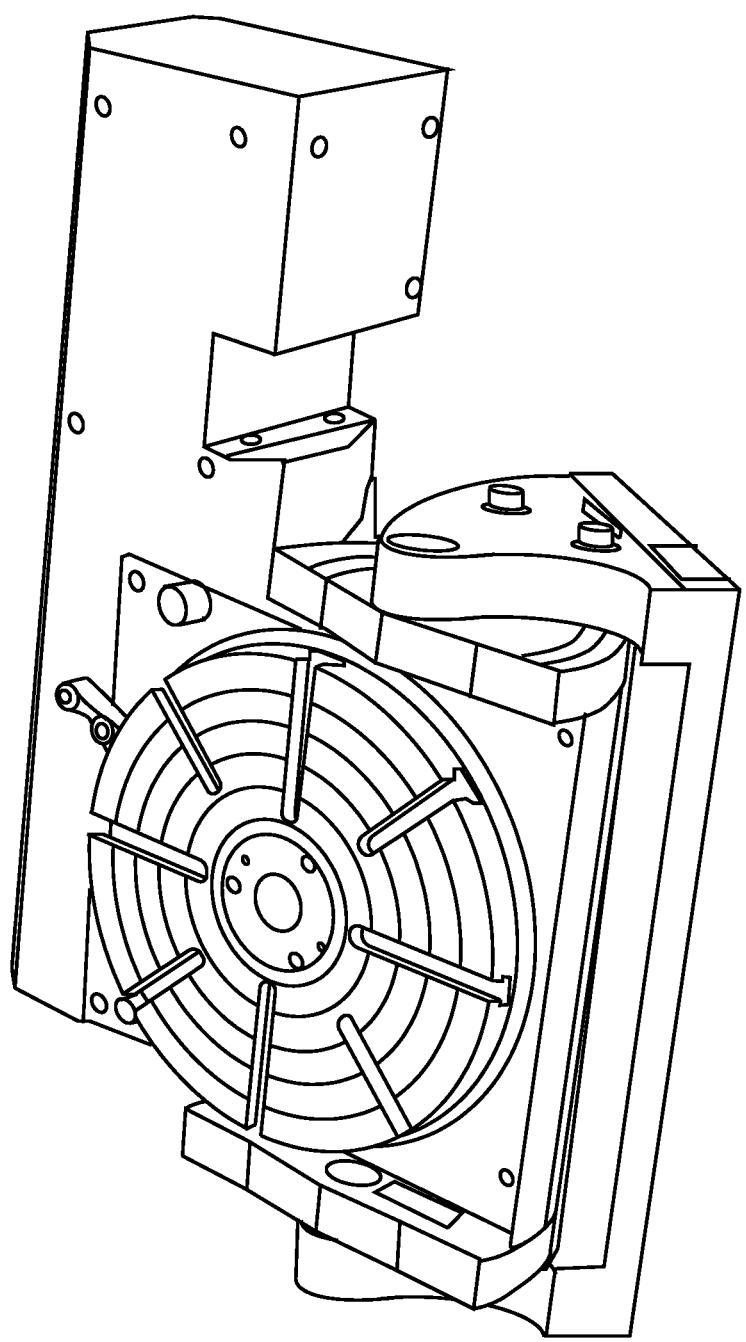
FIG. 19 is a diagram showing an example of an inclination rotary table mechanism.
Figure 20:
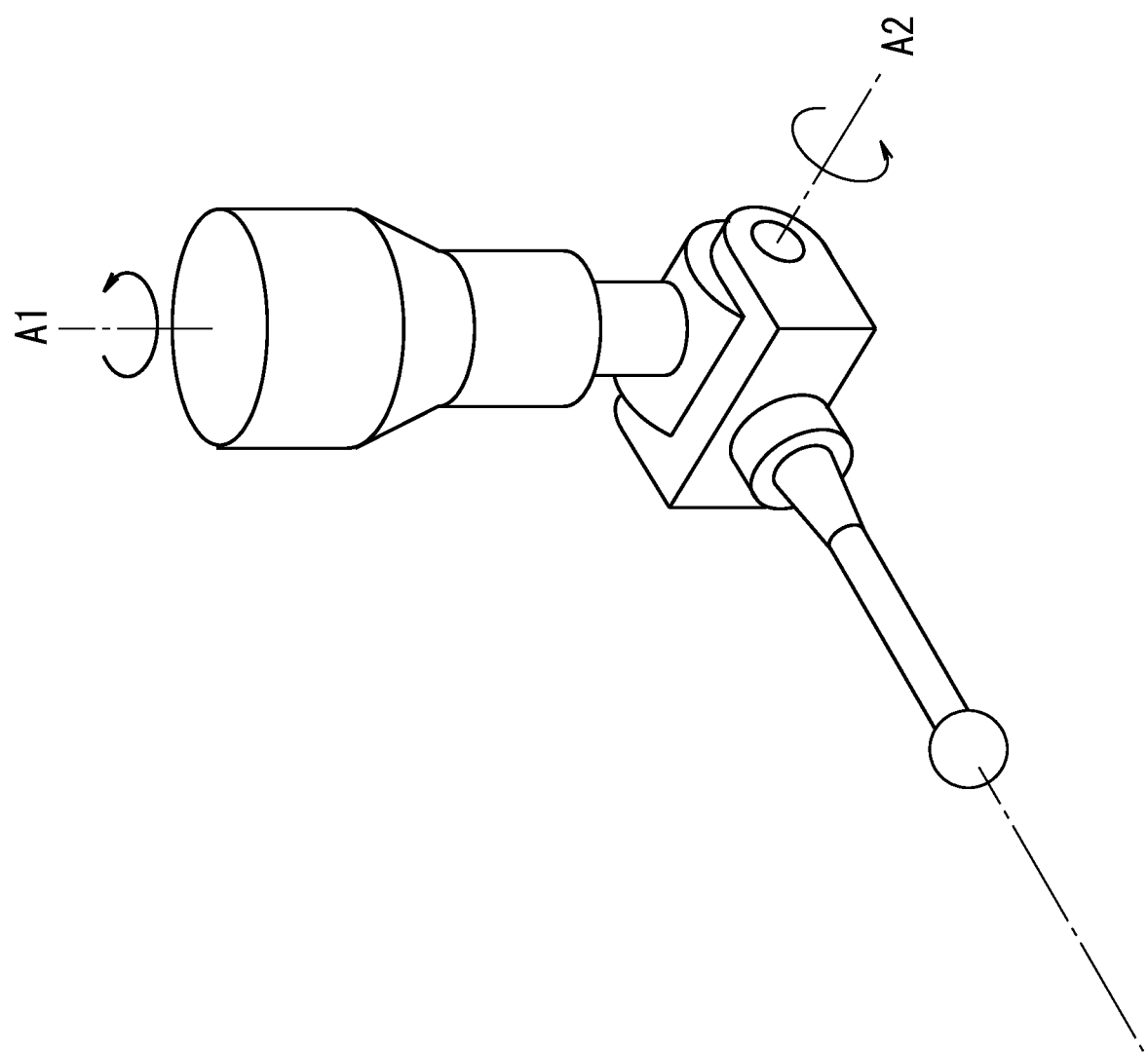
FIG. 20 is a diagram showing an example of a probe having a rotation axis.

For example, as exemplified in FIG. 19, an inclination rotary table mechanism capable of further inclining the rotary table may be employed. In this case, the number of rotation axes is two. Alternatively, there is a known probe having two rotation axes as exemplified in FIG. 20, and a uniaxial probe having one rotation axis may be employed, or a biaxial probe having two rotation axes may be employed. In addition, as a variation of combination, a uniaxial probe having one rotation axis and the rotary table mechanism may be combined and employed. Naturally, a biaxial probe having two rotation axes and the inclination rotary table mechanism may be combined.

When setting a scanning path as a measurement command, the operator also sets a rotation angle command for each rotation axis. The angular velocity pattern for each rotation axis is calculated by the rotation command generating unit 344 as described above. If the number of rotation axes is two or more, the correction for reducing the rotation amount from a translational vector command is still effective.

Fourth Exemplary Embodiment

Next, a fourth exemplary embodiment of the present invention is described below.

The basic configuration in the fourth exemplary embodiment is the same as that in the first exemplary embodiment, but the shape analyzing unit 530 of the host computer 500 corrects a PCC in the fourth exemplary embodiment.

Figure 21:
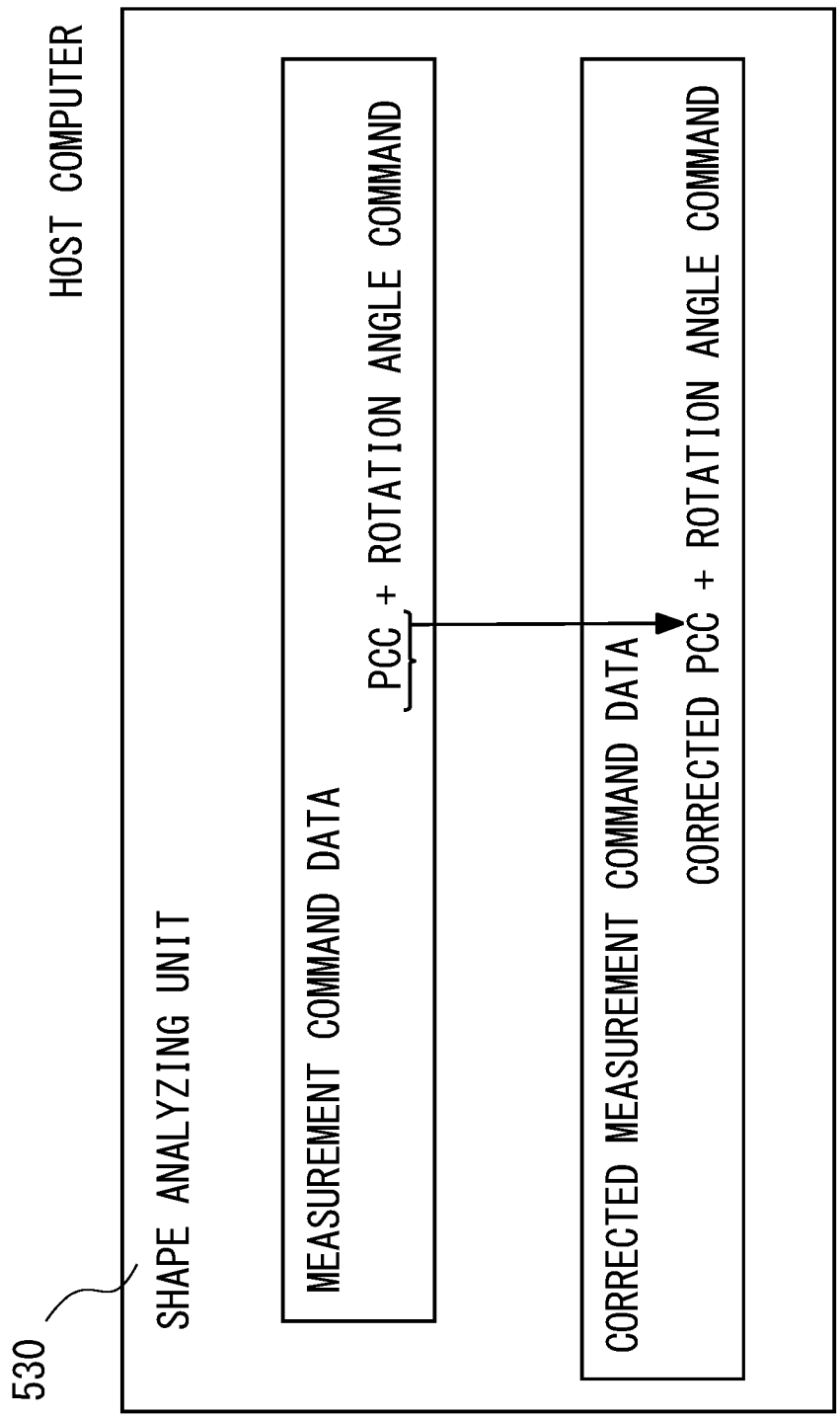
FIG. 21 is a diagram showing an example of the relationship between measurement command data and corrected measurement command data in a fourth exemplary embodiment.

Now, FIG. 21 is referred to.

The processing until the shape analyzing unit 530 generates a PCC and then generates "measurement command data" by adding a rotation angle command to the corresponding section of the PCC is the same as that in the first exemplary embodiment. In the fourth exemplary embodiment, the shape analyzing unit 530 generates a corrected PCC obtained by rotating and moving the PCC by the rotation amount of the rotation angle command to reduce the rotation amount of the rotary table mechanism 250. (Such coordinate conversion processing is more quickly performed by the host computer 500 than by the motion controller 300.)

Figure 22:
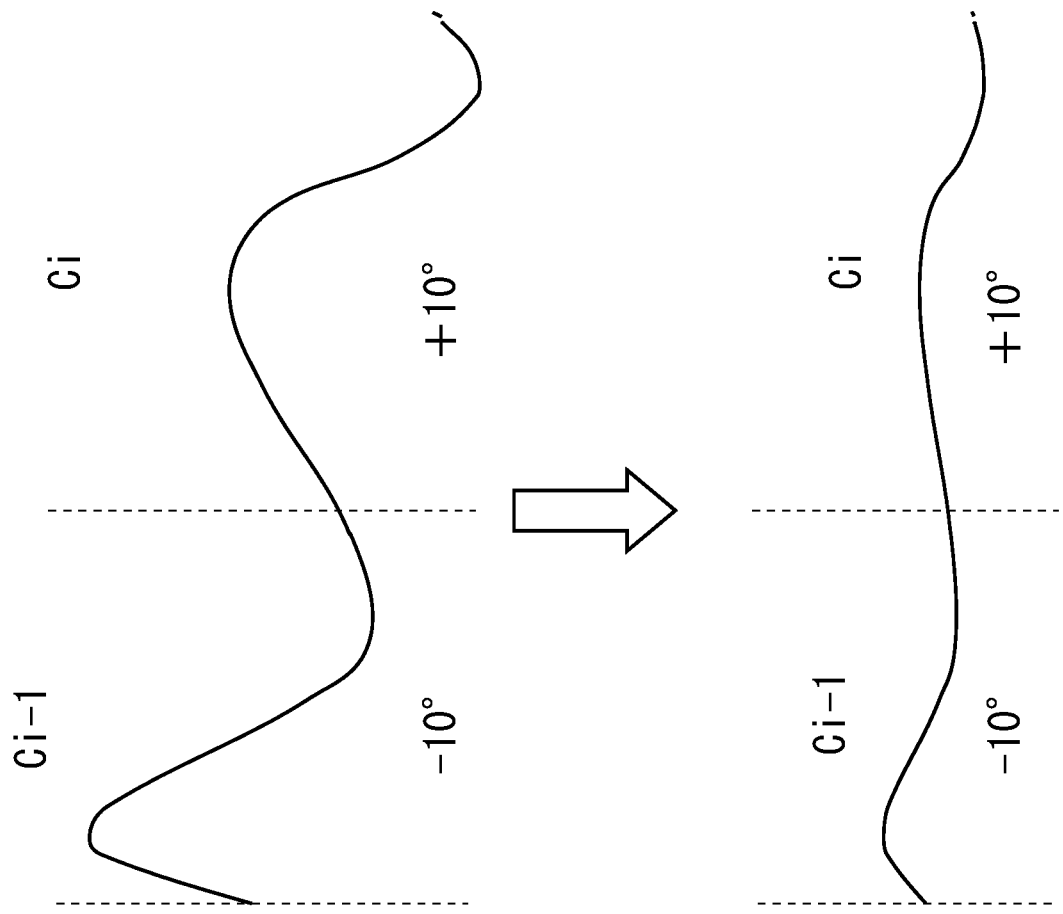
FIG. 22 is a diagram showing an example of a corrected PCC.

When the rotation amount of the rotation angle command is reduced from the PCC, the corrected PCC becomes a smoother curve as exemplified in FIG. 22. (That is, it is expected to obtain a curve that is gentle, has a small curvature as a whole, or has few changes in the curvature. If a rotation angle command is supplied appropriately, the corrected PCC can be a straight line in an extreme case.) The data obtained by adding the rotation angle command for each section to the corrected PCC is referred to as "corrected measurement command data". The "corrected measurement command data" is transmitted from the host computer 500 (shape analyzing unit) to the motion controller 300.

Next, the processing in the motion controller 300 is described below.

Figure 23:
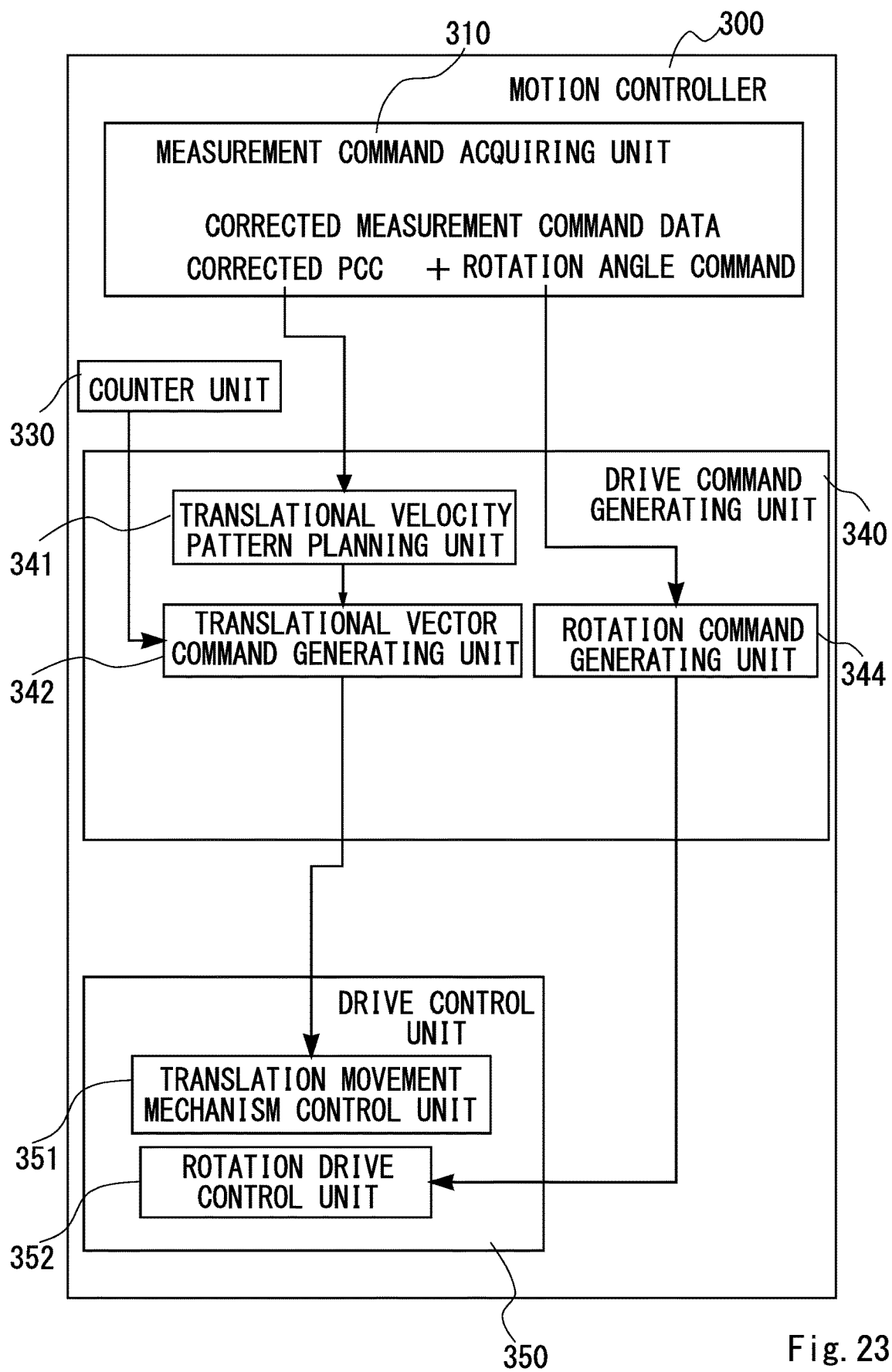
FIG. 23 is a functional block diagram of a motion controller.

FIG. 23 is referred to.

Figure 24:
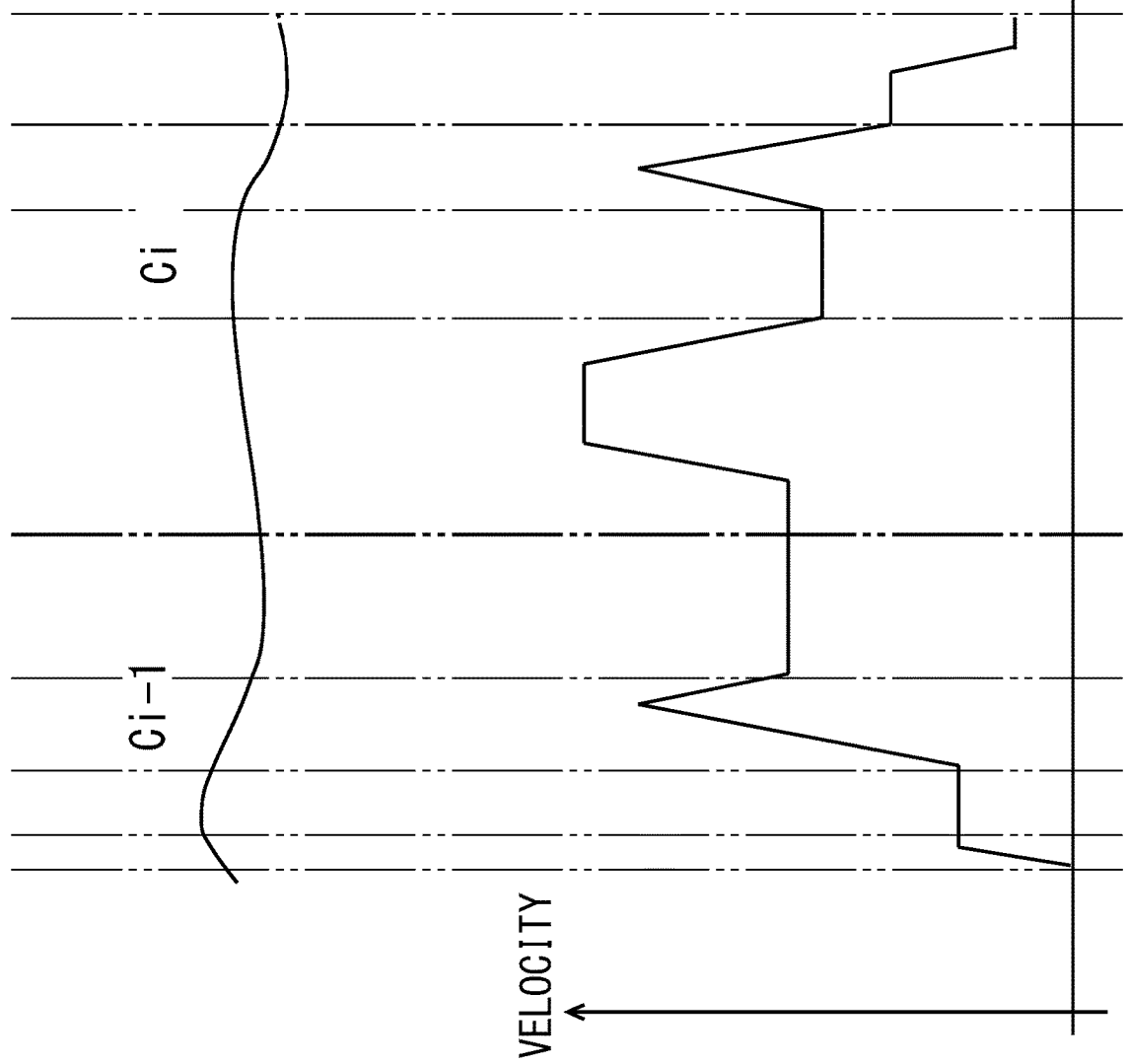
FIG. 24 is a diagram showing an example of a velocity pattern.

The difference from the first exemplary embodiment (FIG. 8) is that the motion controller 300 in the fourth exemplary embodiment is not provided with the translational vector command correcting unit 343. The translational velocity pattern planning unit 341 and the translational vector command generating unit 342 generate a resultant velocity vector V from the corrected PCC with the conventional method. That is, the translational velocity pattern planning unit 341 divides the corrected PCC into divided PCCs and calculates a velocity curve from the divided PCCs to calculate the moving speed (movement vector) of the probe 230 (see FIG. 24). The translational vector command generating unit 342 generates the resultant velocity vector V as described in the related art.

The processing itself is the same as the conventional method and is the same as that in the first exemplary embodiment, but the PCC is corrected to be smooth in the fourth exemplary embodiment. Thus, if the velocity pattern is generated with the same processing, the velocity of the velocity pattern is increased as a whole as exemplified in FIG. 24. The subsequent processing is the same as that in the first exemplary embodiment, and the redundant description is omitted.

According to the fourth exemplary embodiment, it is possible to further shorten the measurement time.

Fifth Exemplary Embodiment

Next, a fifth exemplary embodiment of the present invention is described below.

In the fifth exemplary embodiment, the operator does not set a rotation angle command, but the motion controller 300 (or the host computer 500) automatically generates a rotation angle command from a PCC as a scanning path.

In the fifth exemplary embodiment, the operator only sets a scanning path as in the conventional manner. The shape analyzing unit 530 of the host computer 500 converts the scanning path into a PCC as measurement command data and supplies the data to the motion controller 300. The processing until this point is the same as the conventional method.

Figure 25:
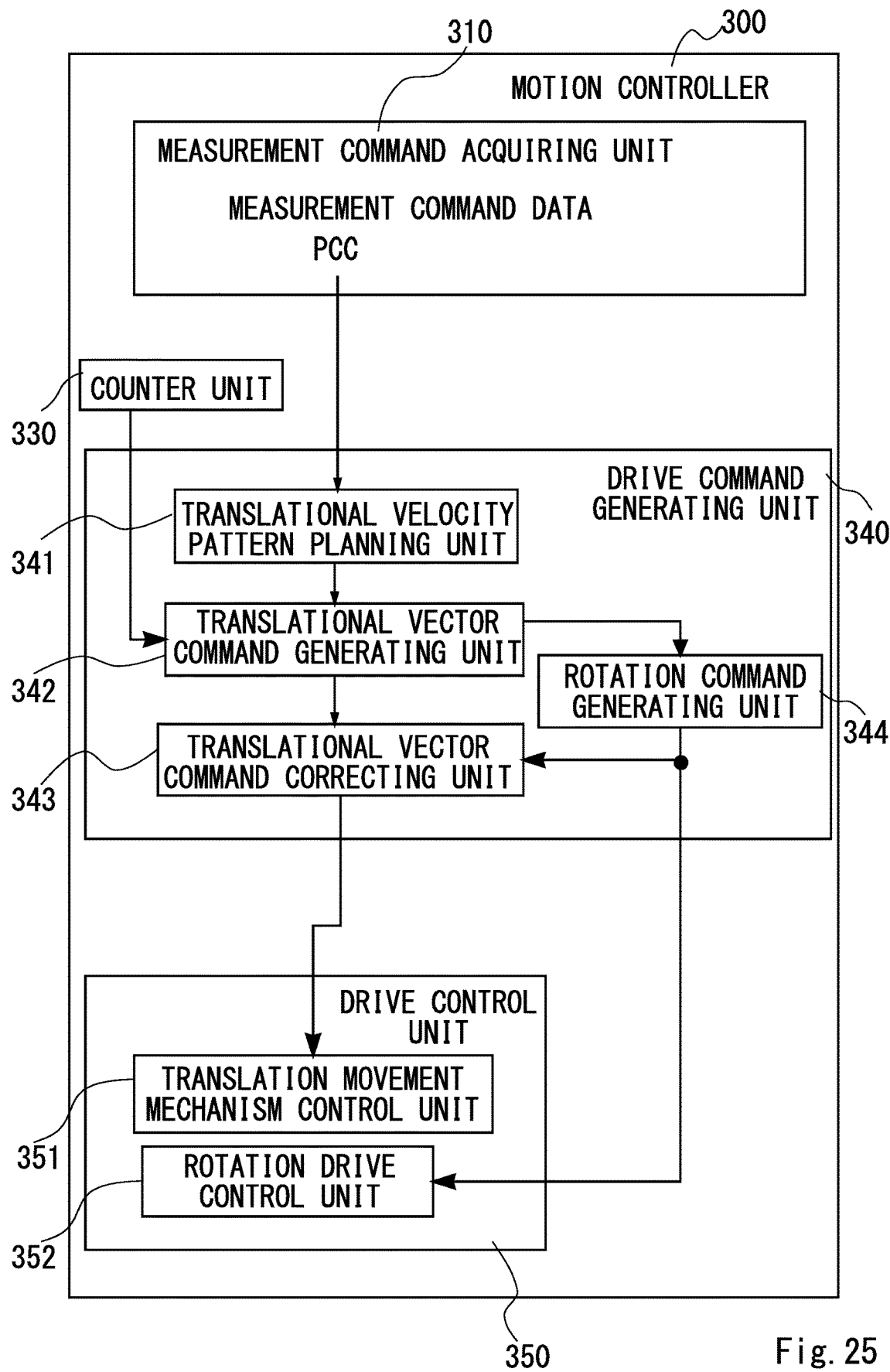
FIG. 25 is a diagram showing a configuration of a motion controller in a fifth exemplary embodiment.

FIG. 25 shows a configuration of the motion controller 300 in the fifth exemplary embodiment. The difference from the first exemplary embodiment is that the rotation command generating unit 344 calculates a rotation angle command for the rotary table mechanism 250.

Figure 26:
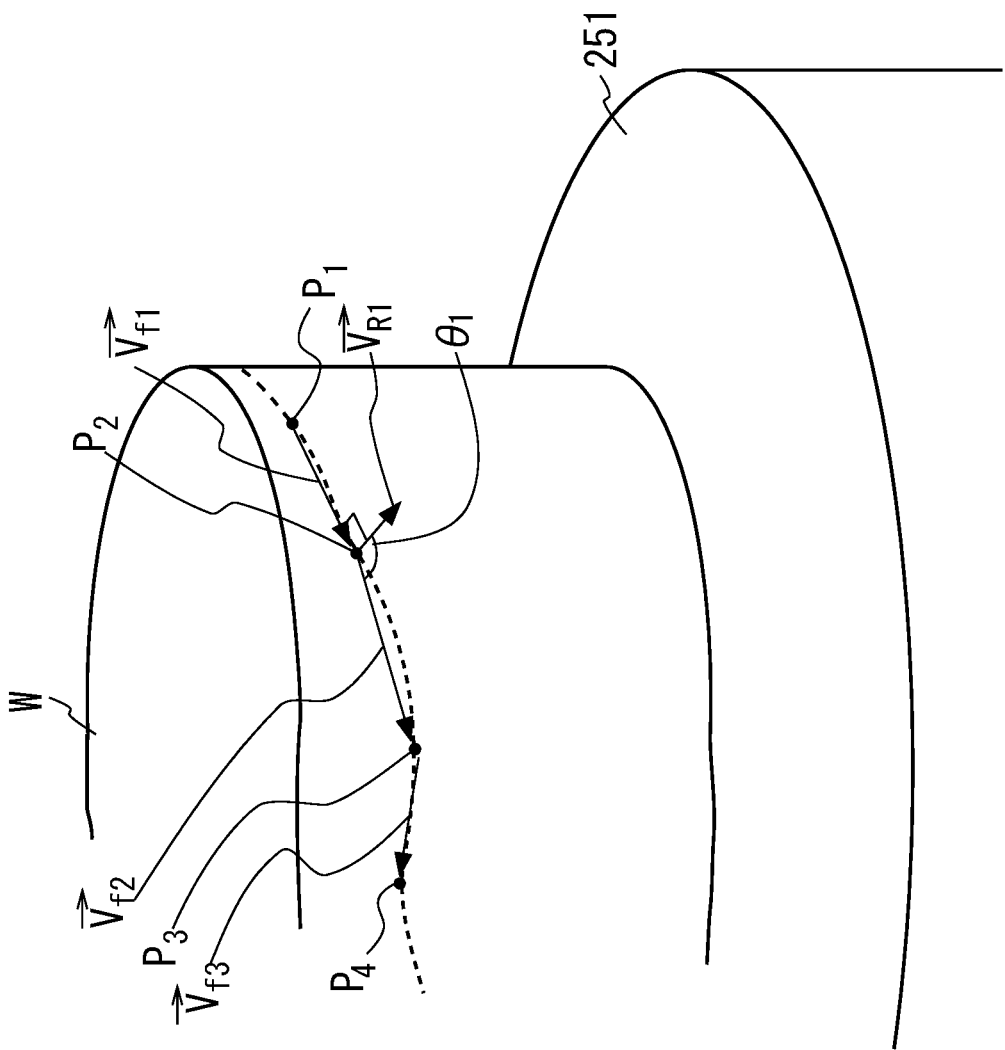
FIG. 26 is a diagram showing an example of a path for scanning measurement.

Here, it is assumed that the operator sets a path for scanning measurement as exemplified in FIG. 26. In addition, interpolation points on the PCC are assumed to be set as P1, P2, P3, and the like. At this time, the path velocity vector directed from the interpolation point P1 to the interpolation point P2 is represented as Vf1. The processing until the vector is obtained is performed by the translational vector command generating unit 342. (Then, the translational vector command generating unit 342 generates a resultant velocity vector V. This processing is the same as the conventional method.)

The rotation command generating unit 344 uses the path velocity vectors Vf1, Vf2, and the like generated by the translational vector command generating unit 342 to generate a rotation angle command for the rotary table mechanism 250. The path velocity vectors Vf1, Vf2, and the like are traveling directions of the probe 230 based on design values. For example, by comparing the path velocity vector Vf1 with the path velocity vector Vf2, the changing amount in the traveling direction is known. By compensating a part or all of this changing amount in the traveling direction with the rotation of the rotary table mechanism 250, the driving amount of the translation movement mechanism 220 is reduced accordingly.

Figure 27:
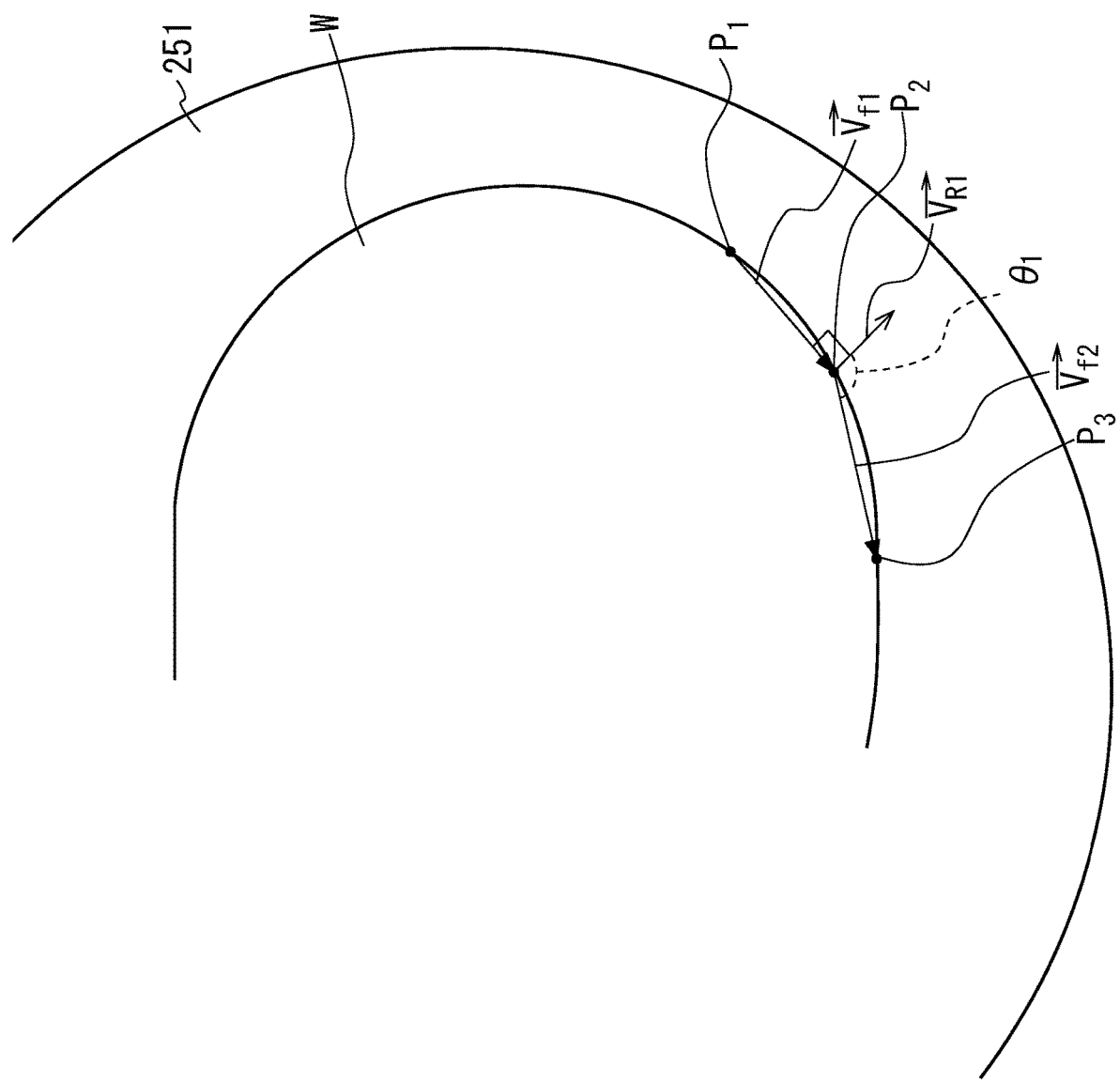
FIG. 27 is a diagram showing the diagram of FIG. 26 along a Z axis.

The method for generating a rotation angle command for the rotary table mechanism 250 from the path velocity vectors Vf1, Vf2, and the like is described as an example. FIG. 27 is a diagram showing the diagram of FIG. 26 along the Z axis. (That is, the diagram is assumed to be projected on the XY plane.) Here, the vector parallel with the Z axis is referred to as a vector Z. In addition, the cross-product vector of the vector Z and the path velocity vector Vf1 is represented as VR1. On the XY plane, the angle formed by the vector VR1 and the path velocity vector Vf2 is represented as θ1. When "θ1−90°" is calculated by subtracting 90° from θ1, the solution corresponds to the change in the traveling direction from the path velocity vector Vf1 to the path velocity vector Vf2. (This means the change in the direction of the path velocity vector when viewed on the XY plane.)

Thus, the rotation angle command for the rotary table mechanism 250 is to be f(θi) as a function of θ1. (Here, the suffix is i (i=1, 2, 3, . . . ). The coefficient and the like of the function f is appropriately determined.) Once the rotation angle command is determined, the translational vector command correcting unit 343 reduces the rotation amount from the resultant velocity vector V to generate a rotation-corrected resultant velocity vector $V_{AMD}$ (corrected translational velocity vector command). The subsequent processing has been described in the first exemplary embodiment and is omitted.

Sixth Exemplary Embodiment

The path velocity vector Vf is used in the fifth exemplary embodiment, but a deflection amount correcting vector Ve is used to calculate a rotation angle command for the rotary table mechanism 250 in a sixth exemplary embodiment.

Figure 28:
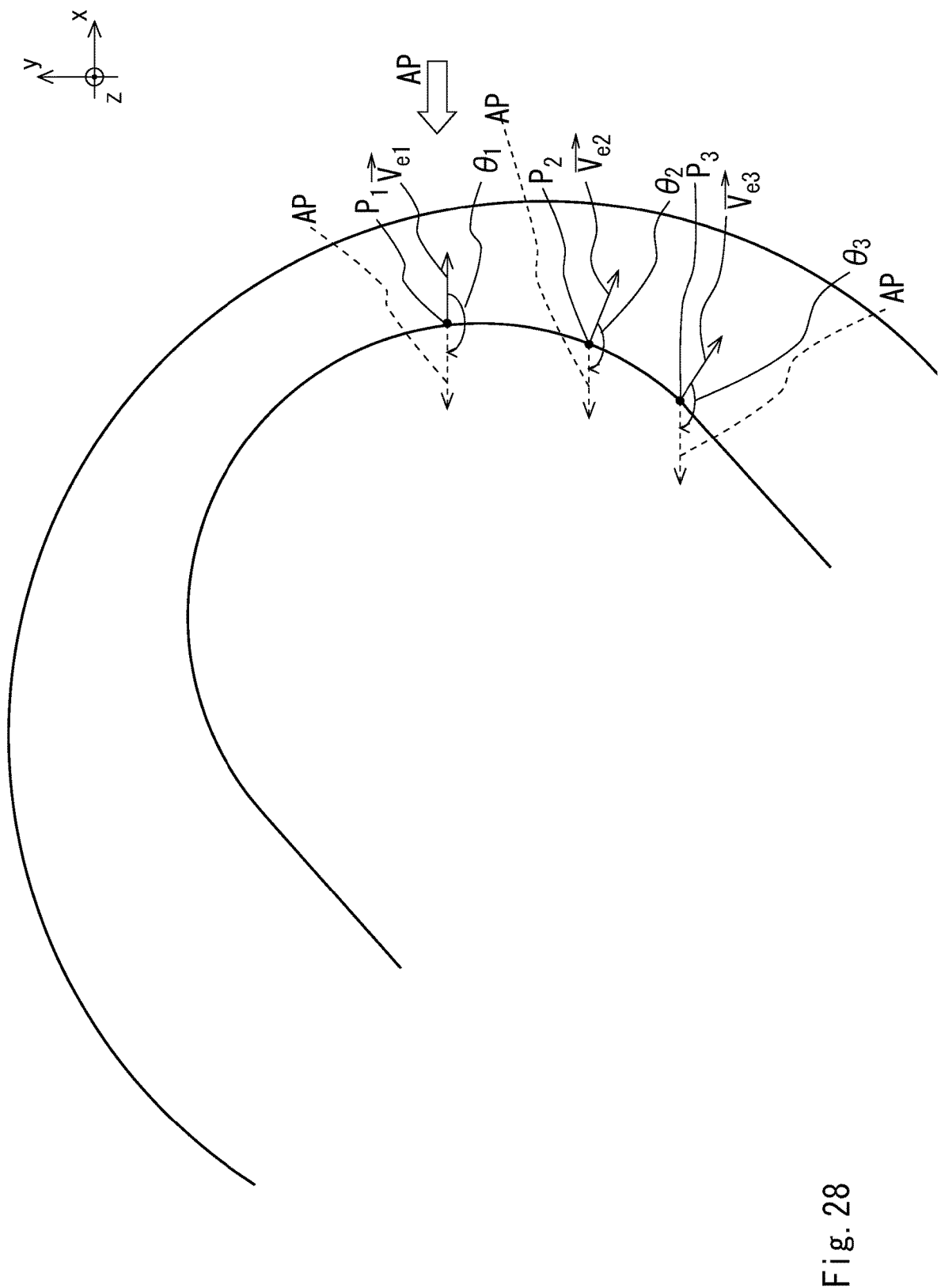
FIG. 28 is a diagram explaining a sixth exemplary embodiment.

With reference to FIG. 28, the sixth exemplary embodiment is described below.

In this example, the direction from the right to the left (that is, "−X direction") is referred to as a predetermined approaching direction AP.

When viewed on the XY plane, if the normal line direction of a workpiece W is maintained to be parallel with the approaching direction AP at a contact point of the probe 230 (the stylus tip 232) and the workpiece W, the workpiece W can be measured with the probe 230 (the stylus tip 232).

The deflection amount correcting vector Ve is a vector for a deflection amount Ep of the probe 230 to be a predetermined reference deflection amount E0 (for example, 0.3 mm) and is calculated from the displacement direction of the probe 230 (the stylus tip 232). The deflection amount correcting vector Ve is necessarily a vector parallel with the normal line of the surface of the workpiece W. Thus, the rotation command generating unit 344 calculates the angle formed by the vector AP in the approaching direction (approach vector AP) and the deflection amount correcting vector Ve to generate a rotation angle command for rotating the rotary table 251 in such a manner that the approach vector AP is parallel with the deflection amount correcting vector Ve. Once the rotation angle command is determined, the translational vector command correcting unit 343 reduces that rotation amount from the resultant velocity vector V to generate a rotation-corrected resultant velocity vector $V_{AMD}$ (corrected translational velocity vector command). The subsequent processing has been described in the first exemplary embodiment and is omitted.

Seventh Exemplary Embodiment

A rotation angle command for the rotary table mechanism 250 is calculated using the path velocity vector Vf in the fifth exemplary embodiment and the deflection amount correcting vector Ve in the sixth exemplary embodiment, but a rotation angle command for the rotary table mechanism 250 is calculated using a resultant velocity vector V in a seventh exemplary embodiment.

The vector is assumed to be projected on the XY plane.

Figure 29:
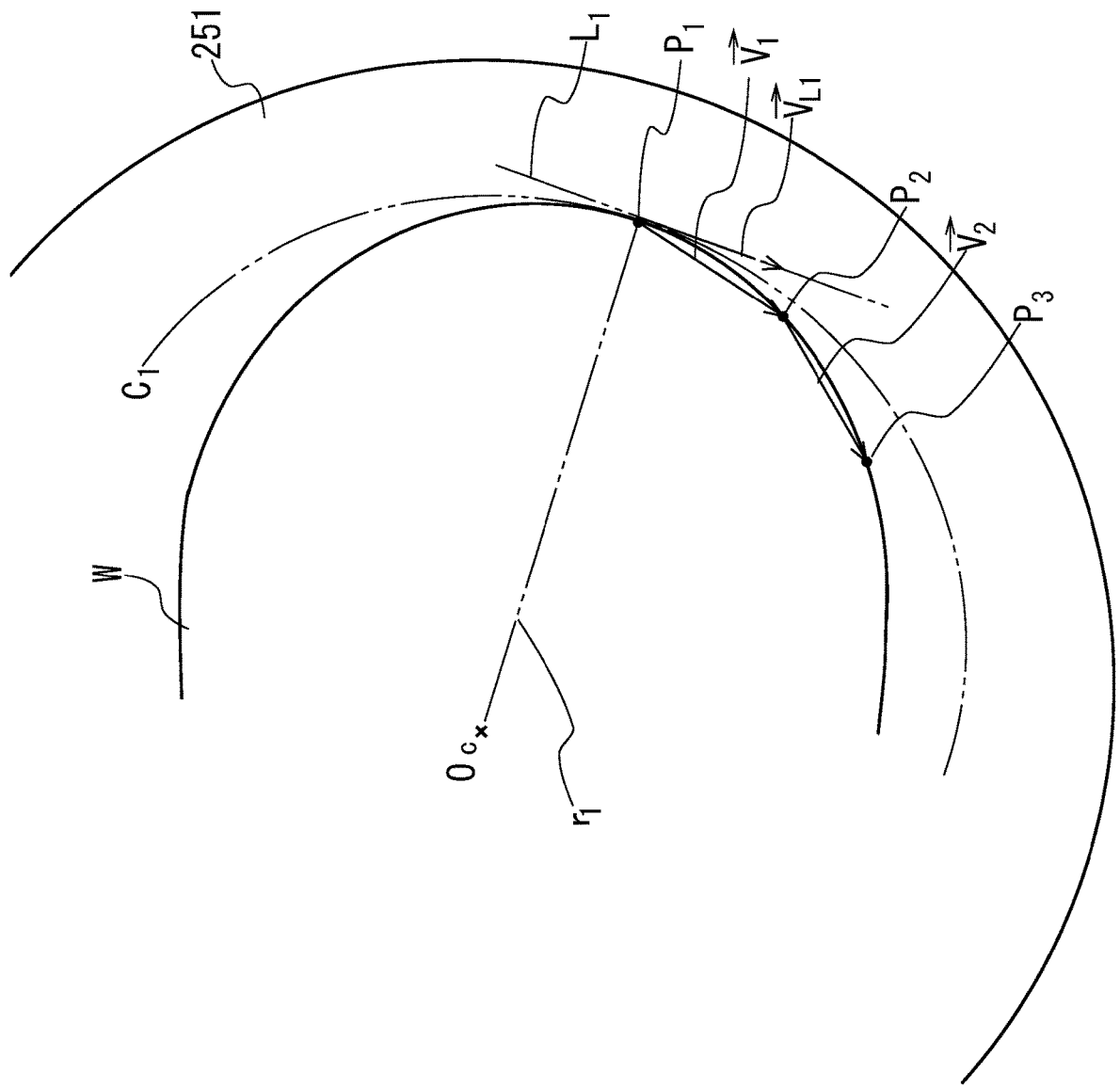
FIG. 29 is a diagram showing an example of calculating a rotation angle command from a resultant vector V.

In FIG. 29, interpolation points P1, P2, P3, and the like are set on a PCC, the translational vector command generating unit 342 generates resultant vectors V1, V2, and the like.

Here, of the elements of the resultant vector V1, the element in the rotating direction of the rotary table mechanism 250 is handled by the rotary table mechanism 250.

The rotation command generating unit 344 generates, for example, a rotation angle command as follows. It is assumed that the rotation center of the rotary table mechanism 250 is represented as OC and a virtual circle C1 has the distance between a point P1 and the center Oc as a radius r1. By drawing a tangent line L1 of the virtual circle C1 at the point P1, of the elements of the resultant vector V1, the element along the direction of the tangent line L1 is calculated. (To be precise, the resultant vector V1 is projected on the XY plane, and the vector projected on the tangent line L1 is calculated.) The vector calculated in this manner is referred to as a rotating direction vector VL1.

By reversely rotating the rotary table mechanism 250 by the rotation amount of the rotating direction vector VL1, the element in the rotating direction of the rotary table become zero for the translation movement mechanism 220. That is, the rotation command generating unit 344 generates a rotation angle command having the direction opposite to the rotating direction vector VL1 and for rotating the rotary table 251 by the same rotation amount of the rotating direction vector VL1. Once the rotation angle command is determined, the translational vector command correcting unit 343 reduces the rotation amount from the resultant vector V to generate a rotation-corrected resultant velocity vector $V_{AMD}$ (corrected translational velocity vector command). The subsequent processing has been described in the first exemplary embodiment and is omitted.

Note that, the present invention is not limited to the above embodiments and can be appropriately modified without deviating from the scope.

In the above embodiments, active nominal scanning measurement is exemplified, but passive nominal scanning measurement may be performed.

The motion controller 300 is separated from the host computer 500 as an example, but the motion controller 300 and the host computer 500 may be integrated and constitute the controller of the coordinate measuring machine.

In the above embodiments, a prove having a stylus tip as a contact ball that detects an object to be measured by being brought into contact with the object is exemplified. However, the probe is not limited to a contact probe and includes a probe that detects an object while the stylus tip is not contact with the object. As such contactless probe, there is a known electrostatic capacitance probe or an optical probe.

A measurement control program may be installed in a storage unit of the host computer through a communication means, such as the Internet or the like, or a (non-volatile) recording medium, such as a CD-ROM, a memory card, or the like. Alternatively, the measurement control program may be stored in a server or the like that may be prepared separately from the host computer, and each necessary part of the measurement control program may be sequentially loaded by the host computer through a communication means, such as the Internet or the like, a LAN cable, a telephone line, or the like. Alternatively, a server installed at a remote place from the coordinate measuring machine may directly control, as the host computer, the coordinate measuring machine and the motion controller.

100 Shape measuring system
200 Coordinate measuring machine
210 Measuring table
220 Translation movement mechanism
221 Y slider
222 X slider
223 Z axis column
224 Z spindle
230 Probe
231 Stylus
232 Stylus tip
233 Supporting part
250 Rotary table mechanism
251 Rotary table
300 Motion controller
310 Measurement command acquiring unit
330 Counter unit
340 Drive command generating unit
341 Translational velocity pattern planning unit
342 Translational vector command generating unit
343 Translational vector command correcting unit
344 Rotation command generating unit
350 Drive control unit
351 Translation movement mechanism control unit
352 Rotation drive control unit
500 Host computer
520 Storage unit
530 Shape analyzing unit

The invention claimed is:

1. A method for controlling a shape measuring apparatus configured to relatively move a probe and a workpiece with a translation movement mechanism and a rotary drive mechanism to perform scanning measurement on the workpiece by moving the probe along a scanning path set in advance, the method comprising:
   synchronizing a movement command for the translation movement mechanism with a rotation command for the rotary drive mechanism in such a manner as to perform scanning measurement on the workpiece by moving the probe along the scanning path.

2. The method for controlling the shape measuring apparatus according to claim 1, the method further comprising:
   setting, by an operator, a scanning path and a rotation angle command for a rotary table;
   generating, based on data about the scanning path, a translational velocity vector command for driving and controlling the translation movement mechanism in such a manner that the probe moves along the scanning path;

generating, based on the rotation angle command, a rotation command for the rotary drive mechanism;

correcting the translational velocity vector command to reduce a rotation amount of the rotation command and generating a corrected translational velocity vector command; and driving and controlling, based on the rotation command and the corrected translational velocity vector command, the rotary drive mechanism and the translation movement mechanism.

3. The method for controlling the shape measuring apparatus according to claim 1, the method further comprising:

setting, by an operator, a scanning path and a rotation angle command for a rotary table;

correcting data about the scanning path to reduce a rotation amount of the rotation command and generating corrected scanning path data;

generating, based on the corrected scanning path data, a translational velocity vector command for driving and controlling the translation movement mechanism;

generating, based on the rotation angle command, a rotation command for the rotary drive mechanism; and driving and controlling, based on the rotation command and the translational velocity vector command, the rotary drive mechanism and the translation movement mechanism.

4. The method for controlling the shape measuring apparatus according to claim 1, the method further comprising:

setting, by an operator, a scanning path;

generating, based on data about the scanning path, a translational velocity vector command for driving and controlling the translation movement mechanism in such a manner that the probe moves along the scanning path;

generating, based on the translational velocity vector command, a rotation command for the rotary drive mechanism;

correcting the translational velocity vector command to reduce a rotation amount of the rotation command and generating a corrected translational velocity vector command; and driving and controlling, based on the rotation command and the corrected translational velocity vector command, the rotary drive mechanism and the translation movement mechanism.

5. The method for controlling the shape measuring apparatus according to claim 4, wherein the generating, based on the translational velocity vector command, the rotation command for the rotary drive mechanism includes generating, based on a change in a direction of a path velocity vector Vf, the rotation command for the rotary drive mechanism, and the path velocity vector Vf is a vector having a direction from one interpolation point on the scanning path to the next interpolation point.

6. The method for controlling the shape measuring apparatus according to claim 4, wherein the generating, based on the translational velocity vector command, the rotation command for the rotary drive mechanism includes generating, based on an angle formed by a deflection amount correcting vector Ve and an approaching direction AP, the rotation command for the rotary drive mechanism, the approaching direction AP is a predetermined direction in which the translation movement mechanism brings the probe into contact with the workpiece, and the deflection amount correcting vector Ve is a vector for correcting a deflection amount Ep of the probe to be a predetermined reference deflection amount E0 and has a direction parallel with a normal line of the workpiece at a contact point.

7. The method for controlling the shape measuring apparatus according to claim 4, wherein the generating, based on the translational velocity vector command, the rotation command for the rotary drive mechanism comprises:

calculating a virtual circle C1 having a rotation center Oc of the rotary drive mechanism as a center and a distance r1 between a contact point of the probe and the workpiece and the rotation center Oc as a radius;

calculating a tangent line L1 of the virtual circle C1 at the contact point;

calculating a rotating direction vector VL1 being an element of the translational velocity vector command in a direction of the tangent line L1; and generating, based on the rotating direction vector VL1, the rotation command for the rotary drive mechanism.

8. The method for controlling the shape measuring apparatus according to claim 1, the method further comprising:

setting, by an operator, a scanning path and a rotation angle command for the rotary drive mechanism;

dividing data about the scanning path into a plurality of segments and setting, based on a curvature of each segment, a translational velocity pattern of the translation movement mechanism for each segment;

calculating for each segment, based on the rotation angle command, a rotation angle value at a start of the segment and a rotation angle value at an end of the segment and generating an angular velocity pattern for each segment;

correcting the translational velocity pattern to reduce a rotation amount of the rotation command given by the angular velocity pattern and generating a corrected translational velocity pattern; and driving and controlling, based on a resultant velocity vector based on the corrected translational velocity pattern, the translation movement mechanism and simultaneously driving and controlling, based on an angular velocity command based on the angular velocity pattern, the rotary drive mechanism.

9. The method for controlling the shape measuring apparatus according to claim 1, the method further comprising:

setting, by an operator, a scanning path and a rotation angle command for the rotary drive mechanism;

correcting data about the scanning path to reduce a rotation amount of the rotation angle command and generating corrected scanning path data;

dividing the corrected scanning path data into a plurality of segments and setting, based on a curvature of each segment, a translational velocity pattern of the translation movement mechanism for each segment;

calculating for each segment, based on the rotation angle command and the translational velocity pattern for each segment, a rotation angle value at a start of the segment and a rotation angle value at an end of the segment;

generating an angular velocity pattern for each segment; and driving and controlling, based on a resultant velocity vector based on the translational velocity pattern, the translation movement mechanism and simultaneously driving and controlling, based on an angular velocity command based on the angular velocity pattern, the rotary drive mechanism.

10. The method for controlling the shape measuring apparatus according to claim 1, the method further comprising:

setting, by an operator, a scanning path;

dividing data about the scanning path into a plurality of segments and setting, based on a curvature of each segment, a translational velocity pattern of the translation movement mechanism for each segment;

generating, based on the data about the scanning path, a translational velocity vector command for driving and controlling the translation movement mechanism in such a manner that the probe moves along the scanning path;

generating, based on the translational velocity vector command, a rotation command for the rotary drive mechanism;

calculating for each segment, based on the rotation command, a rotation angle value at a start of the segment and a rotation angle value at an end of the segment and generating an angular velocity pattern for each segment;

correcting the translational velocity pattern to reduce a rotation amount of the rotation command given by the angular velocity pattern and generating a corrected translational velocity pattern; and driving and controlling, based on a resultant velocity vector based on the corrected translational velocity pattern, the translation movement mechanism and simultaneously driving and controlling, based on an angular velocity command based on the angular velocity pattern, the rotary drive mechanism.

11. The method for controlling the shape measuring apparatus according to claim 8, wherein the generating the angular velocity pattern for each segment comprises:

setting a magnitude of an angular acceleration to a predetermined fixed value; and applying, to each segment, any one of a pattern for maintaining a constant angular velocity, a pattern for accelerating initially and then maintaining a constant angular velocity, and a pattern for maintaining a constant angular velocity initially and then decelerating, by starting calculation from the first segment to generate the angular velocity pattern.

12. The method for controlling the shape measuring apparatus according to claim 11, the method further comprising:

calculating, if the angular velocity is not zero at an end point of the scanning path after the angular velocity pattern for the last segment is generated, a deceleration distance required for the rotary drive mechanism to stop at the end point of the scanning path and correcting the angular velocity pattern in such a manner that the rotary drive mechanism starts decelerating from the required deceleration distance before the end point.

13. The method for controlling the shape measuring apparatus according to claim 8, the method further comprising:

blocking a plurality of the angular velocity patterns generated for each segment; and S-shaped curving an acceleration/deceleration region of the blocked angular velocity pattern.

14. A measurement control program causing a computer to execute the method for controlling the shape measuring apparatus according claim 1.

15. Non-volatile recording medium recording a measurement control program causing a computer to execute the method for controlling the shape measuring apparatus according to claim 1.

* * * * *